(12) United States Patent
Olliphant

(10) Patent No.: US 8,150,718 B2
(45) Date of Patent: Apr. 3, 2012

(54) SYSTEM AND METHOD FOR AUTOMATICALLY SCHEDULING APPOINTMENTS

(76) Inventor: Hugh Olliphant, San Francisco, CA (US)

(*) Notice: Subject to any disclaimer, the term of this patent is extended or adjusted under 35 U.S.C. 154(b) by 309 days.

(21) Appl. No.: 12/465,595

(22) Filed: May 13, 2009

(65) Prior Publication Data

US 2010/0293029 A1 Nov. 18, 2010

(51) Int. Cl.
*G06Q 10/00* (2006.01)
(52) U.S. Cl. ............... 705/7.19; 705/7.18; 705/7.24
(58) Field of Classification Search ............ 705/7.18, 705/7.19, 7.24
See application file for complete search history.

(56) References Cited

U.S. PATENT DOCUMENTS

| | | | |
|---|---|---|---|
| 2004/0093290 A1* | 5/2004 | Doss et al. | 705/35 |
| 2005/0038690 A1* | 2/2005 | Hayes-Roth | 705/9 |
| 2006/0009987 A1* | 1/2006 | Wang | 705/1 |
| 2006/0045029 A1* | 3/2006 | Ethier et al. | 370/260 |
| 2008/0195312 A1* | 8/2008 | Aaron et al. | 701/209 |

OTHER PUBLICATIONS

Marshall, Patrick, Schedule + orders your time, contacts. InfoWorld. San Mateo: May 8, 1995. vol. 17, Iss. 19; p. 106, 1 pgs.*
Meeting Maker Calendar Scheduling Software Features & Benefits, published Mar. 28, 2008, 5 pgs. (downloaded on Nov. 9, 2011 from http://web.archive.org/web/20080328231530/http://www.peoplecube.com/products-meeting-maker-features.htm).*

* cited by examiner

*Primary Examiner* — Romain Jeanty
*Assistant Examiner* — Timothy Padot
(74) *Attorney, Agent, or Firm* — Morgan, Lewis & Bockius LLP

(57) ABSTRACT

The system and method for automatically scheduling appointments includes receiving, at the appointment server system, appointment preference information from a client system associated with a user, wherein the appointment preference information includes contact details for one or more contacts of the user. In response to receiving the appointment preference information from the user, the appointment server system automatically, without human intervention, schedules a first proposed appointment based at least in part on the appointment preference information, wherein the first proposed appointment includes a first location, a first plurality of participants including the user and a first contact of the one or more contacts, and a first date that was not selected by any of the first plurality of participants. The appointment server sends an electronic message to the first plurality of participants including an invitation to the first proposed appointment.

19 Claims, 16 Drawing Sheets

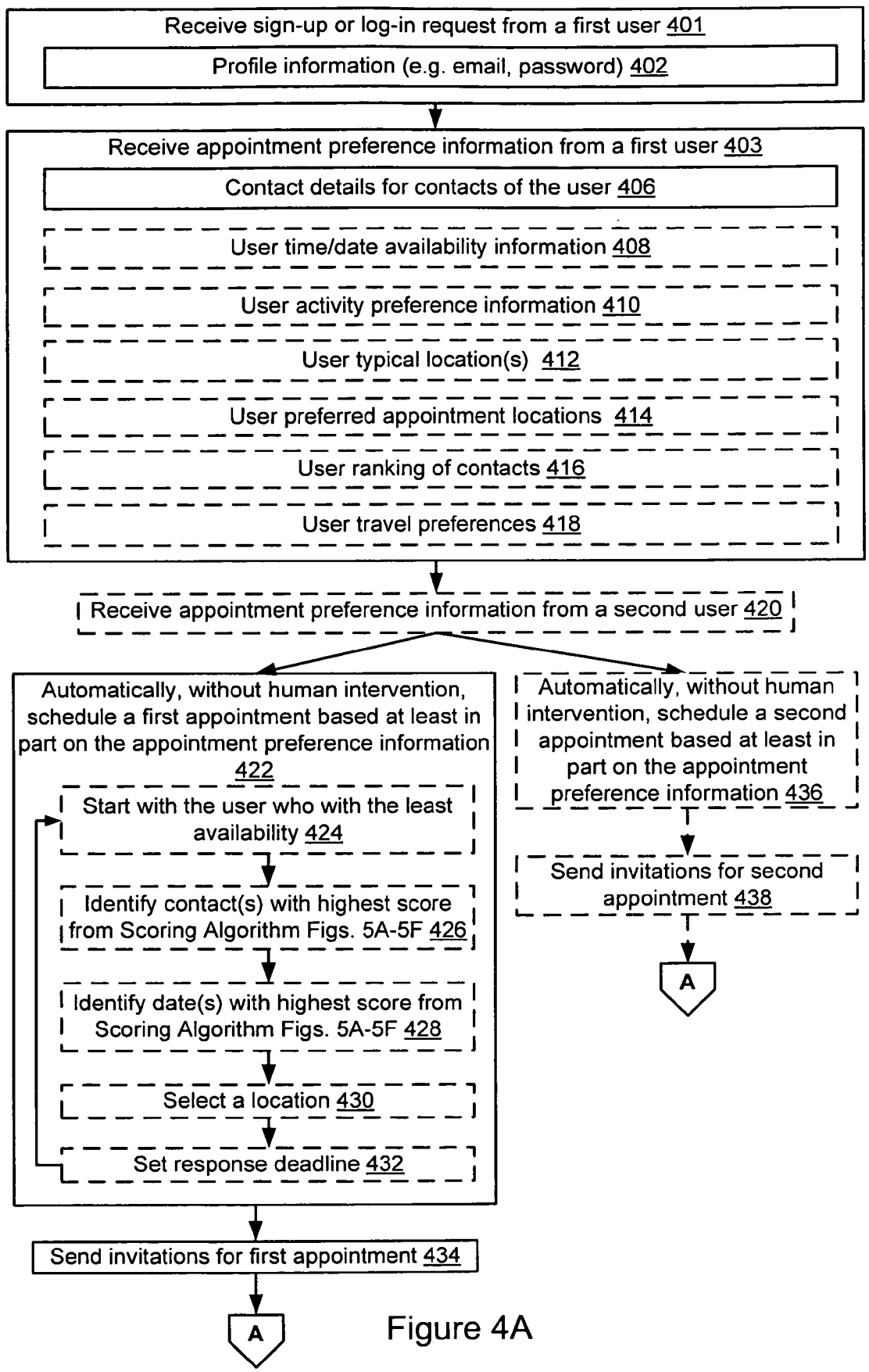

Location Score 530

Behavior Score 574

| (A) Frequency setting | (B) Frequency value | (C) Frequency multiplier | (D) Frequency Category Weight | (E) Desired distribution of Frequency Category | (F) Ideal lunch frequency |
|---|---|---|---|---|---|
| "once" | 1 | 1 | 2 | 4.49% | 22.25 |
| "rarely" | 2 | 1.5 | 4.5 | 6.74% | 14.83 |
| "average" | 3 | 2.25 | 2.25 | 10.11% | 9.89 |
| "often" | 4 | 3.375 | 13.5 | 15.17% | 6.59 |
| Total | | | 22.25 | | |

Figure 6A $$S = \left[ t_{UC} \times \frac{a}{m} \right] - 1 + S_{Default}$$

Figure 6B

Appointment Preferences:
When would you prefer that Lunchster arrange appointments with your friends?

|     | Mon | Tue | Wed | Thu | Fri |
|-----|-----|-----|-----|-----|-----|
| Mar | 2 | 3 | 4 | 5 | 6 |
|     | 9 | 10 | 11 | 12 | 13 |
|     | 16 | 17 | 18 | 19 | 20 |
|     | 23 | 24 | 25 | 26 | 27 |
|     | 30 | 31 | Apr 1 | 2 | 3 |
|     | 6 | 7 | 8 | 9 | 10 |

Next 6 weeks >>

Wednesday March 18, 2009

○ Schedule appointments for me just on Mar 18

● Schedule appointments for me every Wednesday (recommended)

○ Schedule appointments for me the 3rd Wednesday of every month

○ Don't schedule appointments for me on this date

Lunchster will book appointments for you on the days you reserve. Remember that it is easy to cancel if you can't make your appointment.

Save

Figure 7A

Appointment Preferences:
At which restaurants do you prefer to eat for lunch?

Mars Bar and Restaurant  0.13 miles from you
798 Brannan St

Patisserie Phillippe  0.28 miles from you
655 Townsend

Grand Pu Bar – Thai  0.62 miles from you
88 Division St

Café Moda  1.02 miles from you
699 8th St

Flower Market Café  1.27 miles from you
698 Brannan St

Save

Figure 7B

Appointment Preferences:
Decide which contacts you want to have appointments with with more vs less often.

| | Never schedule appointments | Schedule appointments infrequently | Schedule an appointment once only | Schedule appointments infrequently | Schedule appointments often |
|---|---|---|---|---|---|
| Yee Lee | ○ | ○ | ● | ○ | ○ |
| George Lee | ○ | ○ | ● | ○ | ○ |
| Katherine Woo | ○ | ● | ○ | ○ | ○ |
| brian@sofalabs.com | ○ | ○ | ● | ○ | ○ |
| Dion Bregman | ○ | ○ | ○ | ● | ○ |

[Save]

Figure 7C

Appointment Preferences:
How far are you willing to travel for an appointment?

I'm always willing to travel up to [▶ 1 mile]

Sometimes I'm willing to travel [▶ 5 miles]

Every once in a while, I'd even be willing to travel as far as [▶ 15 miles]

( Save )

Figure 7D

SYSTEM AND METHOD FOR AUTOMATICALLY SCHEDULING APPOINTMENTS

TECHNICAL FIELD

The claimed system and method relate generally to the field of appointment scheduling, and more specifically to the field of computerized automatic appointment scheduling using electronic messages.

BACKGROUND

On average, people work near about 20 people who they would like to see more frequently than they do. The top reasons that people cite for not seeing nearby contacts and colleagues more frequently is that 1) they find it difficult to coordinate and 2) they simply forget. As a result of not seeing contacts as frequently, people lose touch with these contacts. Thus, there is a need for a service which automatically coordinates appointments between a user and those contacts with whom the user would like to stay in better touch.

SUMMARY OF EMBODIMENTS

The above deficiencies and other problems associated with coordinating appointments between a plurality of appointment participants are addressed by the system and method disclosed herein for automating the scheduling of periodic meetings, such as lunches, with contacts and colleagues. For some embodiments of the invention, the periodic meetings include other types of social occasions, such as dinners, breakfasts, brunches, coffee dates, happy hours, nights on the town, children's play dates, or any other periodic activity where it is convenient to have appointments automatically scheduled (e.g., in situations where complex logistics make planning difficult). In some embodiments periodic meetings are arranged between the user and parties unknown to the user based on common interests (e.g., political groups and alumni groups). In some embodiments, in order to more fully automate the scheduling of these meetings, the disclosed system and method takes into account factors such as when the participants (e.g., the user and the contacts of the user who are invited to the appointment) are available, what the participants' travel preferences are, preferences for a particular location, and how frequently the users desire to see each other.

In some embodiments, a web-based application automatically organizes periodic appointments between a plurality of participants. In some embodiments, the appointments are dining-based events such as lunches, dinners, Sunday brunches, coffee get-togethers, or breakfasts. In some embodiments, the appointments are for other types of events and social occasions such as regular evenings out with a particular group of contacts or periodic sports spectator events.

In some embodiments, an appointment server system receives appointment preference information from a client system associated with a user, wherein the appointment preference information includes contact details for one or more contacts of the user. In response to receiving the appointment preference information from the user, the appointment server system automatically, without human intervention, schedules a first proposed appointment based at least in part on the appointment preference information, wherein the first proposed appointment includes a first location, a first plurality of participants including the user and a first contact of the one or more contacts, and a first date that was not selected by any of the first plurality of participants. In accordance with this embodiment, the appointment server system sends an electronic message to the first plurality of participants including an invitation to the first proposed appointment.

In some embodiments, scheduling a first proposed appointment based at least in part on the appointment preference information includes searching a database to determine previously defined appointment preference information including appointment preference information associated with the user and, appointment preference information associated with the contact. In some embodiments, the first date includes a time of day.

In some embodiments, in response to receiving the appointment preference information from the user, the appointment server system automatically, without human intervention, schedules a second proposed appointment based on the appointment preference information, wherein the second proposed appointment includes a second location, a second plurality of participants including the user and a second contact of the one or more contacts, and a second time that was not selected by any of the second plurality of participants, wherein the second proposed appointment is not a recurrence of the first proposed appointment. In accordance with this embodiment, the appointment server system sends an electronic message to the second plurality of participants, including an invitation to the second proposed appointment.

In some embodiments, in response to receiving the appointment preference information from the user, the appointment server system automatically, without human intervention, schedules a plurality of proposed appointments based on the appointment preference information, wherein each respective proposed appointment in the plurality of proposed appointments includes a respective location, a respective plurality of participants including the user and a second contact of the one or more contacts, and a respective time that was not selected by any of the respective plurality of participants, wherein each proposed appointment is not a recurrence of any of the plurality of proposed appointments. In accordance with this embodiment, for each proposed appointment, the appointment server system sends an electronic message to the respective plurality of participants, including an invitation to the second proposed appointment.

In some embodiments, the appointment server system receives a reply from at least a subset of the first plurality of participants. In response to receiving the replies, when replies indicating an acceptance of the first proposed appointment have been received from a predefined number of the participants, the appointment server system sends electronic messages to the plurality of participants including a confirmation of the first proposed appointment. In some embodiments, the appointment server system sends a message to a restaurant reservation service and receiving a response confirming the reservation.

In some embodiments, the appointment server system receives a reply from at least a subset of the first plurality of participants. In response to receiving the replies, when replies indicating a rejection of the first proposed appointment have been received from a predefined number of the participants, the appointment server system sends electronic messages to the plurality of participants including a cancellation of the first proposed appointment. In some embodiments, the appointment server system receives a reply from at least a subset of the first plurality of participants; and in response to receiving the replies, when replies indicating an acceptance of the first proposed appointment have not been received from a predefined threshold of the participants before a predefined time period has elapsed, the appointment server system sends electronic messages to the one or more of the first plurality of participants including a cancellation of the first proposed appointment.

In some embodiments, in response to the receiving appointment preference information from the user, the appointment server system sends an electronic message to the user including a placeholder calendar entry indicative of the appointment preference information provided by the user.

In some embodiments, the first plurality of participants includes at least one participant that is not included in the second plurality of participants. In some embodiments, appointment preference information includes information that was collected from third party websites. In some embodiments, appointment preference information includes one or more of: an availability of the user including a plurality of times when the user is available for an appointment, a user location, a user rating of one or more of the participants, travel preferences of one or more of the participants, appointment location preferences of one or more of the participants, dietary restrictions/preferences of one or more of the participants.

In some embodiments, the appointment server system prepares for display to the user an invitation to the first proposed appointment; and prepares for display to a contact of the user an invitation to the first proposed appointment. In some embodiments, the appointment server system receives a reply from a participant; and in response to receiving the reply, the appointment server system updates the appointment preference information for the user. In some embodiments, the electronic message sent to a first participant of the plurality of participants includes an indication of a first travel time of the first participant to the first location; and the electronic message sent to a second participant of the plurality of participants includes an indication of a second travel time of the second participant to the first location. In some embodiments, the indication of the travel time of a respective participant of the plurality of participants to the first location includes a calendar appointment with a start time that is the first time adjusted by a travel time of the participant to the first location.

In some embodiments, prior to automatically scheduling the first proposed appointment, the appointment server system receives, at a first appointment server system, from a mobile device, location information indicative of the location of the user and stores appointment preference information indicative of the likely location of a user.

Thus, the system and methods described herein reduce or eliminate the deficiencies associated with conventional systems and methods for coordinating appointments between a user and those contacts and colleagues with whom the user would like to stay in better touch. Other advantages of embodiments will be apparent from the accompanying drawings and from the detailed description that follows.

BRIEF DESCRIPTION OF THE DRAWINGS

For a better understanding of the nature and embodiments of the invention, reference should be made to the Description of Embodiments section below.

FIGS. 4A-4B are a flow diagram illustrating a process for automatically scheduling appointments in accordance with some embodiments.

FIG. 6A is a chart showing frequency settings for use in automatically scheduling appointments in accordance with some embodiments.

FIG. 6B is an exemplary formula for calculating frequency settings for use in automatically scheduling appointments in accordance with some embodiments.

FIGS. 7A-7D illustrate an exemplary user interface for providing appointment preference information in accordance with some embodiments.

Like reference numerals refer to corresponding parts throughout the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the embodiments. However, it will be apparent to one of ordinary skill in the art that the embodiments may be practiced without these specific details. In other instances, well-known methods, procedures, components, and circuits have not been described in detail so as not to unnecessarily obscure aspects of the embodiments.

Figure 1:
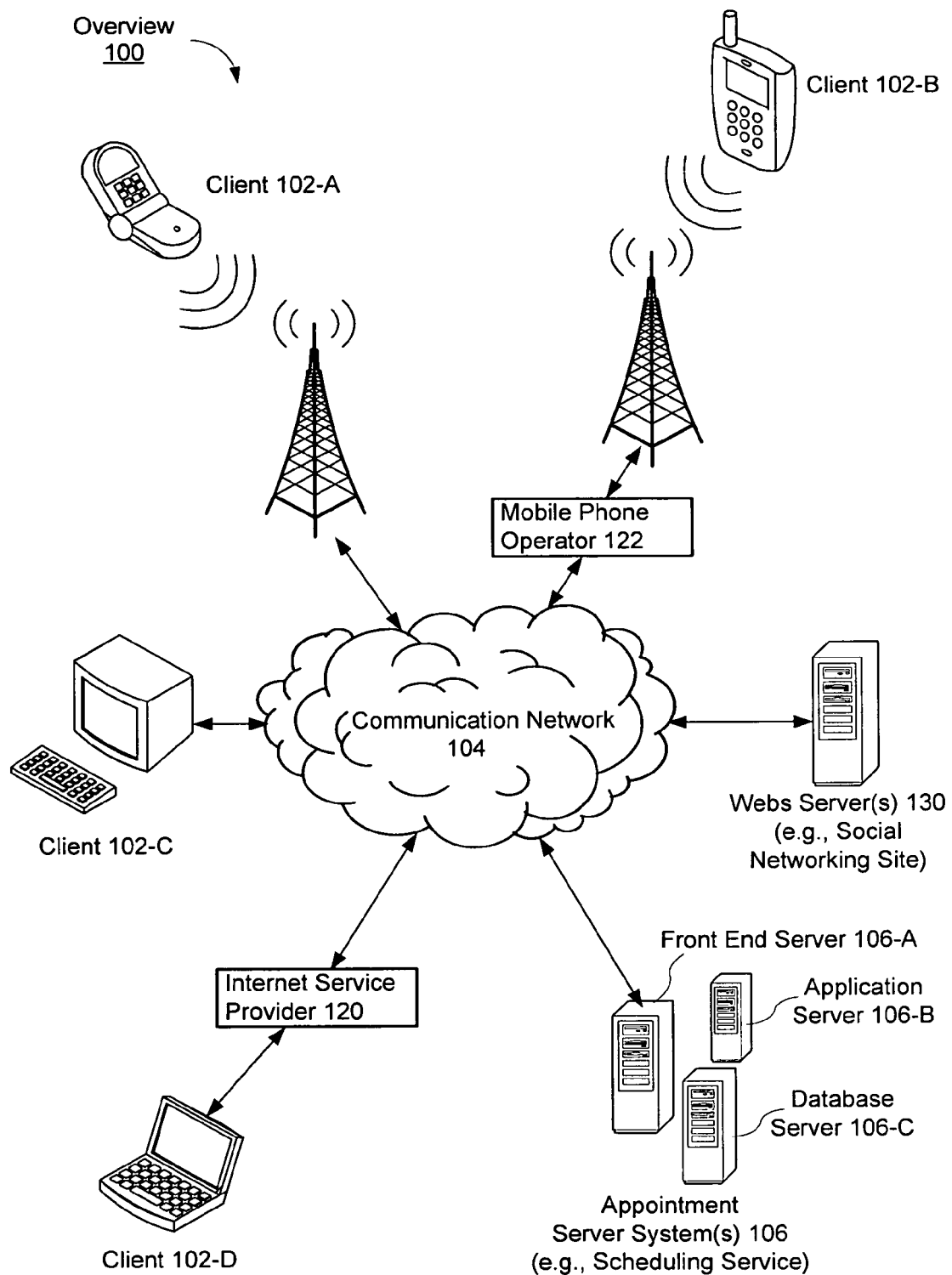
FIG. 1 is an overview of a distributed client-server system in accordance with some embodiments.

Attention is now directed to FIG. 1, which illustrates the infrastructure of a client-server distributed system 100 according to some embodiments. The distributed system 100 includes a plurality of client systems 102A-D and one or more appointment server systems 106, one or more internet service providers 120, one or more mobile phone operators 122, and one or more web servers 130 (e.g., social networking sites). These components are linked together through one or more communication networks 104 (e.g., the Internet, other wide area networks, local area network, etc.) so that the various components can communicate with each other.

A client system 102 may be any computer or similar device that is capable of receiving from the appointment server system 106 data (e.g., web pages, electronic messages, emails, calendar invitations), displaying data, and sending requests (e.g., web page requests, search queries, information requests, login requests, etc.) to the appointment server system 106, the internet service provider 120, the mobile phone operator 122, or the web server 130. Examples of suitable client systems 102 include, without limitation, desktop computers, notebook computers, tablet computers, mobile devices such as mobile phones, personal digital assistants, and set-top boxes. In some embodiments, the term "web page" means any data (e.g., text, image, audio, video, java scripts, etc.) that may be used by a web browser or other client application programs. In some embodiments a web page includes one or more web applications (e.g., an executable application that can be accessed through a web browser over a network).

Requests and other information from a client system may be conveyed to a respective appointment server system 106 using the http protocol (e.g., by using http requests). In some embodiments, the client systems 102 may be connected to the communication network using cables such as wires, optical fibers and other transmission mediums. In other embodiments, the client systems 102 may be connected to the communication network through one or more wireless networks using radio signals or the like.

In some embodiments, the one or more appointment server systems 106 (e.g., facilitating a scheduling service) comprise a single server. In other embodiments the appointment server systems 106 include a plurality of servers, such as a front end server 106-A one or more application servers 106-B and one or more database servers 106-C which are connected to each other through a network (e.g., a LAN, WAN or the like) and exchange information with the client systems 102 through a common interface (e.g., front end server 106-A). In some embodiments, the servers are located at different locations. The front end server 106-A parses requests from the client systems 102, fetches corresponding web pages, electronic messages or other data from the application server 106-B and returns the web pages, electronic messages or other data to the requesting client system(s) 102. Depending upon their respective locations in the topology of the client-server system, the front end server 106-A and the application server 106-B are merged into one software application and/or hosted on one physical server.

The distributed system may also include one or more additional components that are connected to the servers systems 106 and the client systems 102 through the communication network 104. In some embodiments, the internet service provider 120 provides one or more of the client systems 102 with access to the communication network 104. In some embodiments the internet service provider 120 provides a user of one of the client systems 102 with one or more network communication accounts (e.g., email accounts). The mobile phone operator 122 provides access to the communication network 104 to various client systems 102 (e.g., through a proprietary cell phone network).

In some embodiments, the web server 130 is a social networking website, or the like. In these embodiments, a user of one of the client systems 102 has an account with the social networking website including at least a unique user identifier. In accordance with some embodiments, information gathered from the social networking site is used to assist in automatically scheduling appointments by the appointment server system 106. For example, in some embodiments the connection of a user to various contacts through one or more social networking websites are analyzed by the appointment server system 106 and used to automatically select participants for a proposed appointment. Additionally, information such as the number of social connections of the user to a contact in the user's social network or the location of a user or a contact of the user may be acquired from the social networking website and be used by the appointment server system 106 to determine whether the contact should be a participant in the appointment. In some embodiments the web server 130 is an appointment location rating website (e.g., YELP) and is used to select a location for a proposed appointment. For example, in some embodiments, restaurant reviews are taken from a restaurant review website and used to determine the location for a meal-time appointment (e.g., a lunch).

Figure 2:
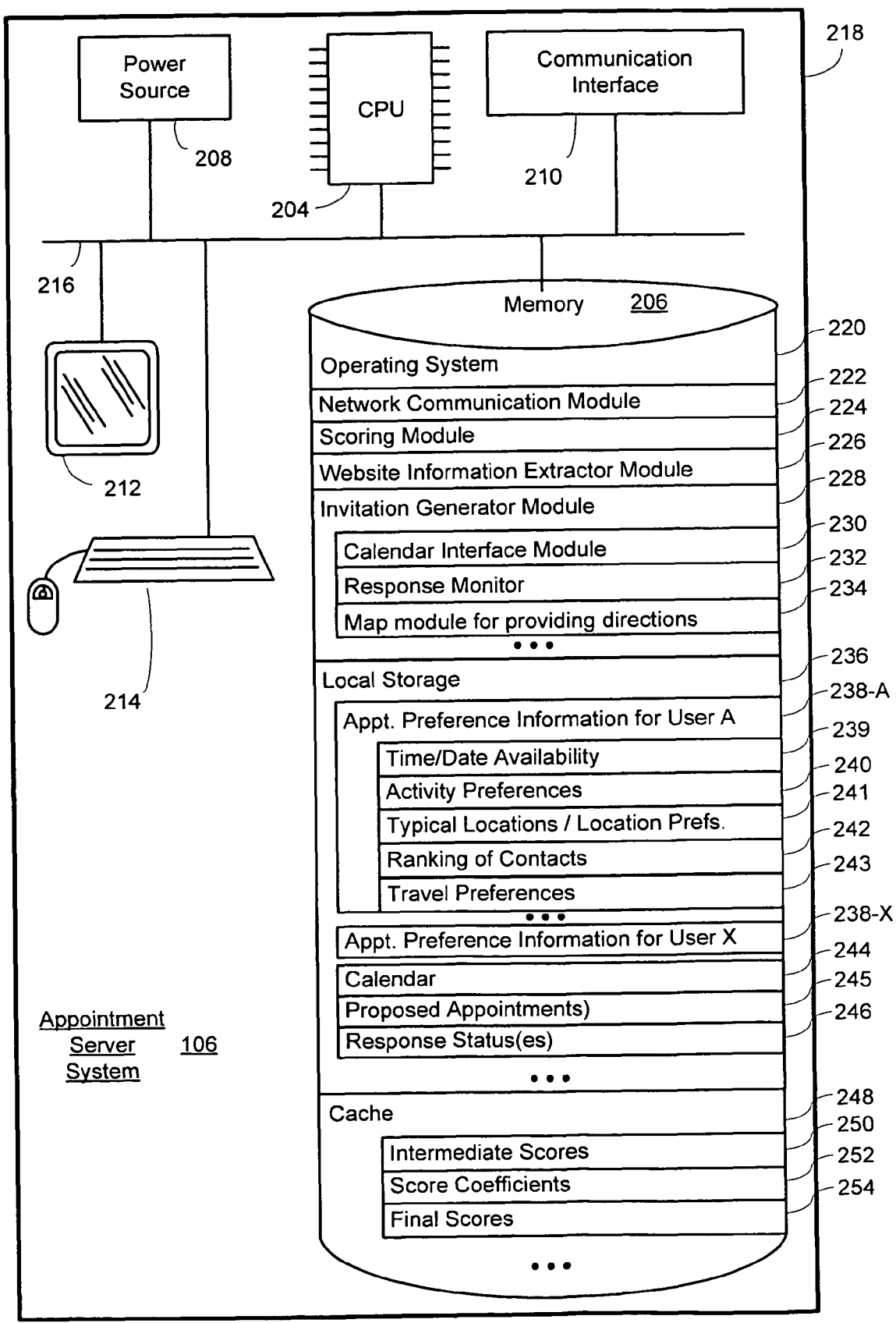
FIG. 2 is a block diagram illustrating an appointment server system in accordance with some embodiments.

FIG. 2 is a block diagram illustrating an appointment server system 106 in accordance with one embodiment. The appointment server system 106 typically includes one or more processing units (e.g., CPUs) 204, one or more power sources 208, one or more network or other communications interfaces 210, memory 206, one or more communication buses 216 for interconnecting these components, and a housing 218. The appointment server system 106 optionally may include a user interface comprising a display device 212 and/or a keyboard and a mouse 214. The memory 206 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 206 may optionally include one or more storage devices remotely located from the one or more CPUs 204. The memory 206, or alternately the non-volatile memory device(s) within the memory 206, comprises a computer readable storage medium. In some embodiments, the memory 206 or the computer readable storage medium of the memory 206 stores the following programs, modules and data structures, or any subset thereof:

An operating system 220 that includes procedures for handling various basic system services and for performing hardware dependent tasks.

A network communication module 222 that is used for connecting the appointment server system 106 to other computers via the communication network interfaces 210 (wired or wireless) and one or more communication networks, such as the Internet, other wide area networks, local area networks, metropolitan area networks, and so on.

A scoring module 224 that is used for ranking and selecting various ones of: a time, a location and participants for a respective appointment.

A website information extractor module 226, for retrieving information about a respective user from websites that include information about the user, including participant preferences (e.g., from a social networking website) and location preferences (e.g., from a restaurant rating website). For example, the website information extractor may operate by getting contacts from FACEBOOK and getting food preferences from YELP.

An invitation generator module 228 for generating electronic messages including an invitation to one or more proposed appointments(s). In some embodiments the invitation generator module 228 includes one or more of the following modules: a calendar interface module 230 for creating electronic appointment invitations in a file compliant with the .ics or .vcs calendaring information format standards (e.g., by creating/sending OUTLOOK appointments); a response monitor 232 for monitoring the number of confirmed attendees and sending reminders, confirmations and cancellations, as discussed in greater detail below; and a map module 234 for providing directions from the location of a user to the location of the appointment.

Local storage 236 for storing appointment preference information for users 238, including time/date availability 239, activity preferences 240, typical locations and/or location preferences 241, rankings of contacts 242 and travel preferences, calendar information 244, proposed appointments 245, and the response statuses 246 of participants for the proposed appointments 245; and A cache 248 for storing data such as intermediate scores 250 that are calculated while the scoring module is selecting a time, location or participants for a respective appointment, as well as score coefficients 252 for selectively weighting the intermediate scores as described in greater detail below.

Each of the above identified programs, modules and/or data structures may be stored in the previously mentioned memory, and corresponds to a set of instructions for performing the functions described above. The above identified modules or programs (i.e., sets of instructions) need not be implemented as separate software programs, procedures or modules, and thus various subsets of these modules may be combined or otherwise re-arranged in various embodiments. In some embodiments, the memory 206 may store a subset of the modules and data structures identified above. Furthermore, the memory 206 may store additional modules and data structures not described above.

Figure 3:
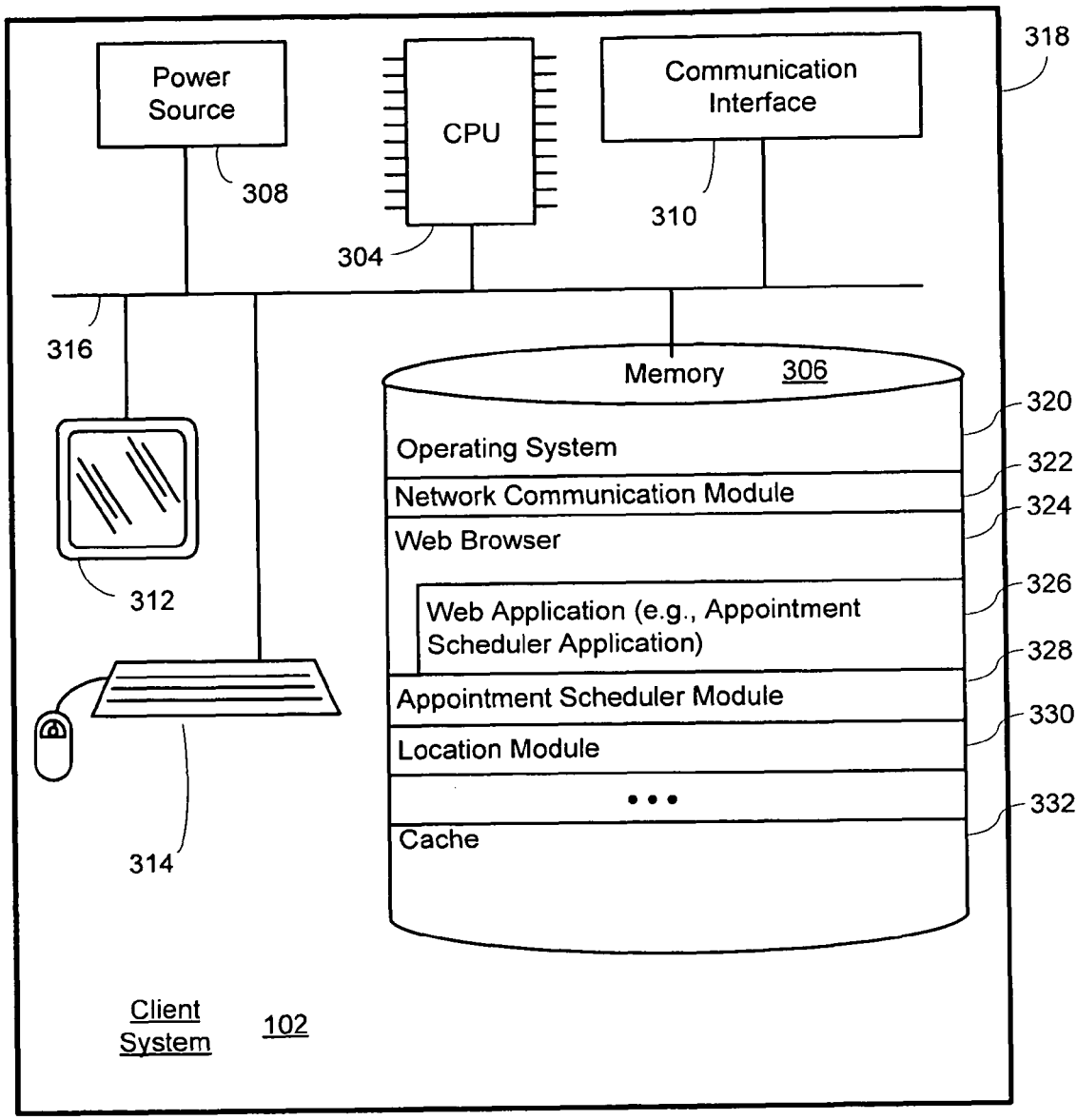
FIG. 3 is a block diagram illustrating a client system in accordance with some embodiments.

FIG. 3 is a block diagram illustrating a client system 102 in accordance with one embodiment. The client system 102 typically includes one or more processing units (CPUs) 304, one or more power sources 308, one or more network or other communications interfaces 310, memory 306, one or more communication buses 316 for interconnecting these components, and a housing 318. The client system 102 optionally may include a user interface devices including a display device 312 and a keyboard and mouse 314 or a touch sensitive surface. The memory 306 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 306 may optionally include one or more storage devices remotely located from the CPU(s) 304. The memory 306, or alternately the non-volatile memory device(s) within the memory 306, comprises a computer readable storage medium. In some embodiments, the memory 306 or the computer readable storage medium of the memory 306 stores one or more of the following programs, modules and data structures, or a subset thereof:

- An operating system 320 that includes procedures for handling various basic system services and for performing hardware dependent tasks.
- A network communication module 322 that is used for connecting the client system 102 to other computers via the one or more communication network interfaces 310 (wired or wireless) and one or more communication networks, such as the Internet, other wide area networks, local area networks, metropolitan area networks, and so on.
- A web browser 324, for receiving a user request for a web page and rendering the requested web page on the display device 312 or other user interface device, in some embodiments the web browser includes a web application 326 for the execution of appointment scheduling tasks.
- An appointment scheduler module 328 for the execution of appointment scheduling tasks (e.g., a locally stored application instead of a web application such as MICROSOFT's OUTLOOK calendaring program).
- A location module 330 for detecting the location of the client system (e.g., using a global positioning system module) and periodically reporting the location of the client system to the appointment server system (e.g., sending the appointment server system the location of the client system at a typical lunch time, so that the appointment server system can use that information when scheduling a lunch appointment for the user).
- A cache 332 for temporarily storing information (e.g., storing location information before it is sent to the appointment server system).

FIGS. 4A-5F are flowcharts representing a method for automatically scheduling appointments for one or more users, according to certain embodiments. This method may be governed by instructions that are stored in a computer readable storage medium and that are executed by one or more processors of one or more servers. Each of the operations shown in FIGS. 4A-5F may correspond to instructions stored in a computer memory or computer readable storage medium. The computer readable storage medium may include a magnetic or optical disk storage device, solid state storage devices such as Flash memory, or other non-volatile memory device or devices. The computer readable instructions stored on the computer readable storage medium are in source code, assembly language code, object code, or other instruction format that is interpreted by one or more processors.

Appointment Preference Information

Figure 4B:
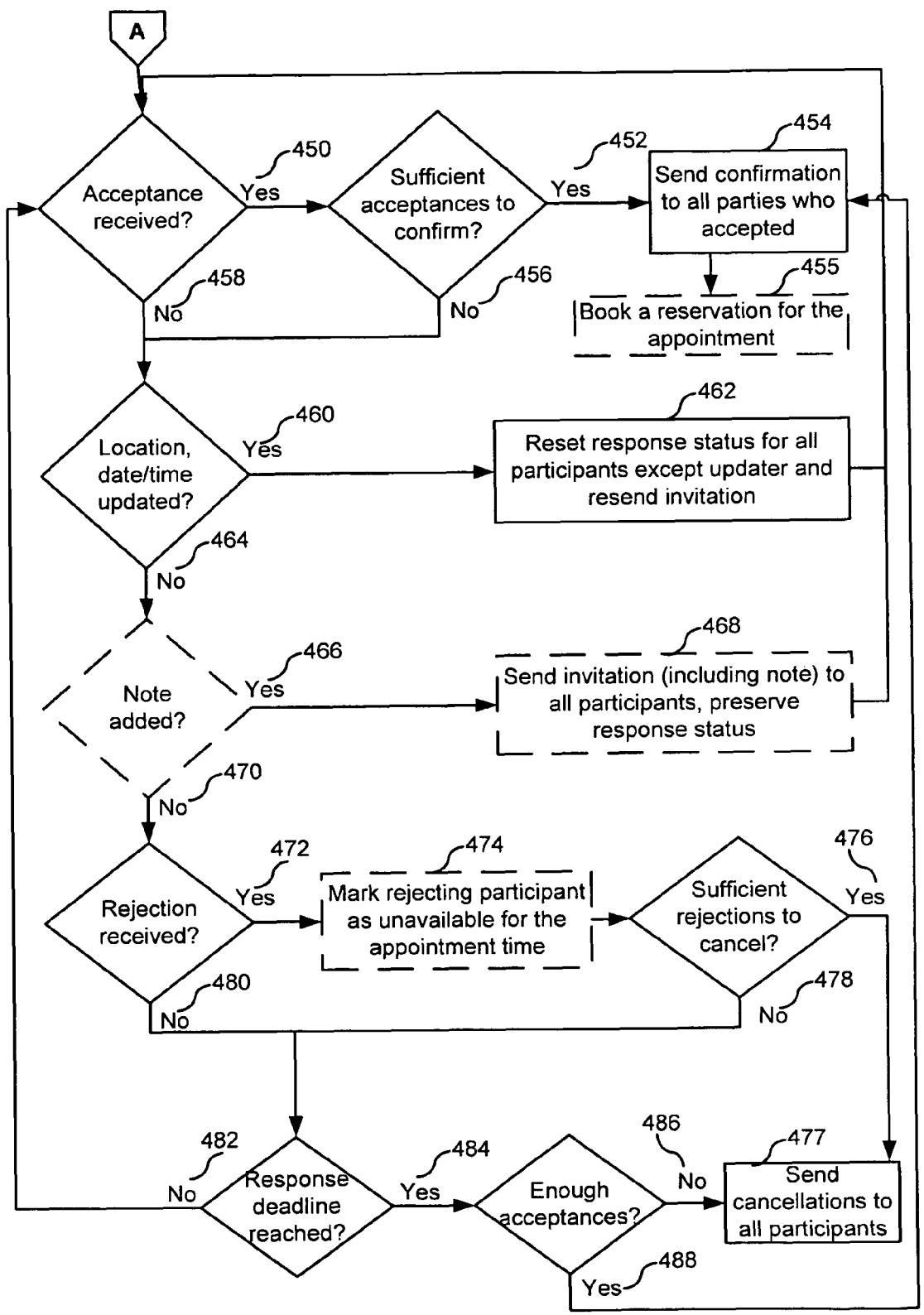

Attention is directed towards FIGS. 4A-4B, which illustrate a process for automatically scheduling appointments in accordance with some embodiments. An appointment server system 106 receives (401) sign-up or log-in request from a client system 102 associated with a first user. A sign-up request is a request from a new user to create a user account with the appointment server system 106. A log-in request is a request from a returning user who has already signed up to access a previously created account with the appointment server system 106. In some embodiments the client system 102 is a computing device associated with a user (e.g., a cell phone or a personal digital assistant) in some embodiments the client system 102 includes an instance of a client application (e.g., a web application or a locally stored application) that the associated user is logged into.

In some embodiments, sign-up or log-in request includes profile information (404) (e.g., a unique user identifier such as an email address and password associated with an account of the user on the server system). In some embodiments, the user also provides multiple identifiers including one or more emails, one or more phone numbers, or one or more third party usernames to services such as SKYPE, YAHOO INSTANT MESSENGER, and other communication channels. The server system may use these identifiers to access web servers associated with the third party services and acquire information about the user including information about the user's contacts, location or dining preferences. Alternatively, the appointment server system may also rely on identity services such as FACEBOOK CONNECT in order to uniquely identify the user.

In some embodiments the appointment server system 106 receives (403) appointment preference information from the client system 102 associated with the first user. The appointment preference information also includes contact details (406) for one or more contacts of the first user. In some embodiments, the user identifies contacts (e.g., friends, colleagues, professional contacts, and other individuals) with whom the user would like to remain in touch by having periodic appointments (e.g., lunches). This process may include any of the following: 1) collecting email addresses manually typed in by the user, or 2) allowing the user to provide credentials to an online address book, email program, or social network, then allowing the user to select contacts from that service, or 3) allowing the user to select contacts stored within the client system, such as an OUTLOOK contacts program or mobile phone address book. In an alternative embodiment, the user may provide the phone numbers of contacts and colleagues instead of entering email addresses. The user's list of contacts and colleagues are considered by the scoring process as described in greater detail below with reference to FIGS. 5A-5F.

In some embodiments, all of the appointment preference information is gathered directly from the user (e.g., entered by the user into an appointment scheduling website or client application). It should be understood that appointment preference information is information that is helpful in scheduling a meeting (e.g., availability, location preferences, participant preferences). In contrast, appointment scheduling information for a particular appointment includes the precise date, participants and location for a specific appointment (i.e., a request to schedule a lunch with a friend next Tuesday).

In some embodiments, at least a subset of the appointment preference information is gathered from one or more additional sources other than the user. For example, the user could enter profile information (e.g., a unique user identifier and a password) for one or more web services (e.g., email, social networking websites, restaurant ranking websites) and the appointment server system will access those websites and determine the contacts of the user, the ranking of contacts of the user, and the ranking of restaurants by the user. At least a subset of the information acquired from third party web services is used by the appointment server system to select times, locations and participants for an appointment that are desirable for the user, as described in greater detail below with reference to FIGS. 5A-5F.

In accordance with some embodiments, the appointment preference information 238 includes additional information that is useful for scheduling appointments, such as information from one or more of the following categories:

User data/time availability information (408) (e.g., the times of day and/or days of the week that the user is typically available or the times and dates when the user is available for appointments) including at least a plurality of times when the user is available. An exemplary user interface for indicating availability is shown in FIG. 7A. In some embodiments availability for appointments is indicated by any date/time that has not been marked by a user as "unavailable." In some embodiments, the user indicates what their availability will be for an appointment (e.g., a lunch appointment). If the appointment server system does not yet have the user's time zone and it is unable to determine this information from the client system associated with the user, then it will solicit this information from the user. The plurality of times when the user is available may be represented as a periodic interval such as "every other Wednesday," the user may also select individual dates and times when they will be available for an appointment.

In some embodiments, a first user accesses the appointment server system and provides (402) appointment preference information to the appointment server system. In response to the receiving appointment preference information from the first user, the appointment server system sends an electronic message to the first user including a placeholder calendar entry based at least in part on the appointment preference information provided by the first user (e.g., for a date/time when the first user is available). If the first user uses an electronic calendar which supports the vcal format, such as OUTLOOK, GOOGLE CALENDAR, or APPLE ICAL, then placeholders are sent by the appointment server system 106 to the user's electronic calendar via a multipart email or text message which includes a vcal or ical attachment. The vcal or ical in the electronic message allows the electronic calendar to automatically update the user's calendar with the appointment placeholder information. These placeholders ensure that the user's appointment date/time is reserved. The user may also indicate that they do not use an electronic calendar, in which case, no placeholders are sent.

In some embodiments, the user allows the appointment server system to view their online appointment calendar in order to facilitate or automate the availability selection. In some embodiments, the calendar sharing is enabled through one or more of the following methods, including: (1) a user sharing their authentication credentials for their online calendar, (2) a user installing a client-side program such as an OUTLOOK plug-in, (3) the user enabling sharing with the appointment server system from within their calendar program, or (4) a user setting his electronic calendar to publish or broadcast his availability to the appointment server system 106. Additionally, if a user's electronic calendar reveals the availability of contacts of the user (e.g., friends and colleagues), then the appointment server system 106 can use this information to populate information about the user's contact. For example, an OUTLOOK plug-in may be designed such that the plug-in accesses the availability of work colleagues on a common MICROSOFT Exchange Server. As another example, some of the user's contacts may share their availability with the user through GOOGLE CALENDAR's sharing functionality; in these cases, the appointment server system may analyze the availability of those contacts. The user's availability is considered by the scoring process as described in greater detail below with reference to FIGS. 5A-5F.

User activity preference information (410) (e.g., the types of activities that the user enjoys). In some embodiments, the user provides information about the user's interests in addition to, or instead of, providing a list of contacts as listed above. The appointment server system may request specific information from the user, or may ask the user to give permission and any necessary authentication credentials so that the appointment server system may collect or infer the user's interests from an online service, such as a social networking website. Interests may include things such as dating, profession-related interests, hobbies, and the like. The user's interests are considered by the scoring process as described in greater detail below with reference to FIGS. 5A-5F.

User typical location(s) (412) (e.g., the usual location of the user at lunch time). In accordance with some embodiments, the user provides information about where the user is typically located at different times in the day or days in the week (e.g., the location of their workplace at lunchtime). Alternatively, if the user is using the appointment server system through a client system which supports location-awareness, such as an IPHONE with GPS, then the appointment server system may infer the user's location information using the GPS information. The appointment server system may support more than one location for the user. For example, if the location information provided either by the user or the client system indicates that the user typically spends Fridays working from home, then the appointment server system will propose lunches on Fridays which are closer to the user's home. The user's location or locations are considered by the scoring process as described in greater detail below with reference to FIGS. 5A-5F.

User preferred appointment location(s) (414) (e.g., restaurants where the user likes to eat lunch). In some embodiments, the appointment server system will retrieves a list of restaurants near the user's location and ask the user to indicate their desire to eat at these establishments. An exemplary user interface for indicating appointment location preference is shown in FIG. 7B. Information on nearby restaurants may be provided by a service such as YELP or GOOGLE LOCAL. The appointment server system may allow the user to retrieve their restaurant preferences with another service where the user may have rated and reviewed restaurants, such as YELP. For example, assume that a given user has actively used the YELP service to rate restaurants in her area. The user provides a YELP username, which the appointment server system can use to extract the user's restaurant ratings from the YELP website. If the restaurant rating service provides other means to access its user's ratings, such as an Application Programming Interface (API), then the appointment server system may use those other means as well. The user's preferred appointment locations are considered by the scoring process as described in greater detail below with reference to FIGS. 5A-5F.

User ranking of contacts (416) such as by specifying a desired appointment frequency (e.g., how frequently the user would like to meet each of his or her contacts for lunch). An exemplary user interface for indicating appointment frequency preferences for a contact is shown in FIG. 7C. In some embodiments, the appointment server system provides an option for the user to rate their contacts (e.g., friends and colleagues) according to how often the user would like to schedule an appointment with them. For example, a user may select: "never", "rarely," "often," or "one appointment only". This same methodology can be applied to groups. For example, a user may select to have appointments with his or her political group "rarely." For interests, the user may be asked to rate the importance of these interests (e.g., political appointments="once a quarter," lunch appointments="once every other week," wine tasting appointments="twice a week"). The user's ratings of contacts, groups, and interests are considered by the scoring process as described in greater detail below with reference to FIGS. 5A-5F.

User travel preferences (418) (e.g., how far the user is willing to travel to meet with a contact for lunch). In some embodiments, the appointment server system 106 allows the user to specify preferences around how often the user is willing to travel. An exemplary user interface for indicating travel preferences is shown in FIG. 7D. This embodiment asks the user to specify a radius that they are willing to travel various distances, although it would be readily apparent to one having ordinary skill in the art that other divisions of timing categories could also be used. For example, a user can indicate that they are "always willing to travel 1 mile", "sometimes willing to travel 10 miles", and "rarely willing to go as far as 25 miles". The appointment server system then takes these considerations into account so that a user does not need to travel farther than 10 miles for more than 20% of their appointments. The defaults for these distances can change depending on the user's location so that New York uses a much smaller radius for each category, while Phoenix uses a larger radius for each category. For some alternate embodiments, the appointment server system may obtain these preferences through other means, such as asking whether the user has a car or other method of transportation at a particular time of day (e.g., lunchtime). The user's travel preferences are considered by the scoring process as described in greater detail below with reference to FIGS. 5A-5F.

It should be understood that any information that would be useful for scheduling an appointment may also be included here, such as user dietary restrictions or dietary preferences, etc.

In accordance with some embodiments, the appointment preference information also includes appointment preference information received (420) from a second user and one or more additional users. It should be understood that the appointment preference information associated with the second user, or any other user, may be of the types previously described, and may be received by the appointment server system 106 by any of the previously described methods. In some embodiments, the second user is a contact of the first user and the appointment preference information includes a rating of the second user by the first user (e.g., Mike is a contact of John, Mike has rated John and John has rated Mike). In some embodiments, when two or more of the participants or users for a proposed appointment each have associated appointment preference information, the appointment preference information for each of the participants is used to determine the details of the proposed appointment. For example, if the first user likes restaurant A and restaurant B and does not like restaurant C, while the second user likes restaurant D and restaurant B, but does not like restaurant A, then a proposed appointment (e.g., a lunch) including both the first user and the second user will be scheduled at restaurant B, rather than restaurant A or restaurant D.

In some embodiments, the appointment server system is configured to schedule proposed group appointments (e.g., appointments including a plurality of participants from a predefined group of users). In accordance with some embodiments, the appointment server system 106 allows users to join or form appointment groups, either to facilitate small appointments among subsets of the users in the group, or to facilitate appointments for the group as a whole (e.g., all of the users in the group). In some embodiments the group owner specifies the ideal number of participants for an appointment; the ideal appointment frequency; whether concurrent appointments are permitted as might be needed for larger groups; whether the group moderator needs to be invited to all group appointments; if there are any specific geographic bounds for the group (e.g., that all events take place in Sunnyvale); whether there are any specific timing constraints (e.g., a specific day of the month that must be adhered to for appointments).

For example, a user might create local political appointment groups so that local members of a large political organization can get to know one another better in small working groups of 4-6 people. To continue the example, once per quarter, the appointment server system would arrange 20 concurrent appointments in and around Chicago for members of this political organization. To exemplify how a small appointment group might use the appointment server system, a group of 10 individuals might all be invited to a monthly appointment (e.g., lunch). However, because the appointment server system attempts to gather information on individual locations and availability, and measures individual response rates over time, the appointment server system is better able to propose the most convenient locations for those members who are likely to attend any particular meeting. The user's group affiliations are considered by the scoring process as described in greater detail below with reference to FIGS. 5A-5F.

After receiving the appointment preference information (420) (e.g., in response to receiving the appointment preference information), in some embodiments, the appointment server system automatically, without human intervention, schedules (422) a first appointment for the user based at least in part on the gathered appointment preference information, wherein the first proposed appointment includes a first location, a first plurality of participants including the first user and a first contact of the one or more contacts of the first user, and a first date that was not selected by any of the first plurality of participants. It should be understood that, in accordance with some embodiments, an appointment time refers to a unique date and time combination (e.g., Wednesday, Apr. 15, 2009 at 12:30 pm PDT).

In accordance with some embodiments, scheduling a first proposed appointment based at least in part on the appointment preference information includes searching a database to determine previously defined appointment preference information including appointment preference information associated with the first user and, appointment preference information associated with the contact. For example, the time, location and participants included in the proposed appointment may be selected by the appointment server system based on the ratings of a first participant and a second participant for each other, the willingness of each participant to travel and the meeting location preferences of each participant.

Scheduling Process

The process of automatically, without human intervention, scheduling appointments begins by looking at the availability of each user as indicated by the user's profile. In some embodiments this process starts (424) with the user who has the least availability. If there is no information on the availability of a user, then the user's availability may be set to a predetermined default value (e.g., "always available" or "once a week"). For that user, the appointment server system will review each of the user's contacts in descending order of the user-contact score, as described in greater detail below with reference to FIGS. 5A-5F.

In some embodiments, the appointment server system identifies (426) one or more contacts of the user with the highest user-contact score (e.g., the contact is the highest ranked contact, or the contact has a ranking of "schedule appointments frequently") and selects a user-contact pair as participants in the proposed appointment. In some embodiments an appointment includes additional participants (i.e., a group appointment), as discussed in greater detail below. It should be understood that, in some embodiments, because the scheduling process is dependent on the scoring process, it must be run after the user-contact score pairs have been updated through the scoring process, as described in greater detail below with reference to FIGS. 5A-5F. It should also be noted that, by reviewing each of the user's contacts in descending order of the user-contact score, the best matches will be considered first. In some embodiments, the appointment server system will stop scheduling appointments for a user once it runs out of available dates within a predetermined timeframe (e.g., 28 days) or once it runs out of potential appointment participants (e.g., contacts of the user).

The appointment server system automatically identifies one or more dates for the proposed appointment. In some embodiments, the first step in this review is to identify a suitable date for the participants to meet for their appointment by identifying (428) a date with the highest score assigned to it through the scoring process described in greater detail below with reference to FIGS. 5A-5F. The appointment server system identifies a suitable date by checking to see if there is an available date within a predefined time period (e.g., 3-28 days from the current day) that is available for all of the participants. In some embodiments, after a tentative date is selected, the date scoring process is re-run to make sure that nothing changed which might cause the appointment to be cancelled, such as a user has changed their availability. Assuming the date score is positive (e.g., the date is available for all proposed participants), then, in some embodiments, the appointment server system sets a response deadline, such as three working days from the date that the meeting invitation is sent. If the score for a particular user-contact pair is zero, then the appointment server system will not schedule an appointment for that pair. For example, in accordance with this embodiment, if User A is only available for lunch on Tuesdays and User B is only available for lunch on Wednesdays, then User A and User B do not share any availability, and the user-contact pair score is zero, meaning that the appointment server system will not try to schedule a lunch between User A and User B.

In some embodiments, the appointment server system automatically selects (430) a location for the appointment. In accordance with some embodiments, the location selection process begins by identifying a general location for the appointment (also called an epicenter) using the location of each of the participants and the willingness to travel. For example if user A is located 10 miles from user B, and user A is willing to travel 8 miles, while user B is only willing to travel 3 miles, the appointment server system will identify an "epicenter" for the appointment that is 2-3 miles away from user B and 7-8 miles away from user A. For example, in one embodiment, when the participants' travel preferences are the same, the epicenter is a midpoint for participants who are more than 20 miles apart. In some embodiments, when the distance between the location of two users is less than a predetermined distance (e.g., 20 miles), the appointment server system selects one user's location as the epicenter, which effectively reduces the travel distance for the user who has their location selected as the epicenter.

In some embodiments, the appointment server system changes which user is benefited by the location of the epicenter based on the amount of traveling of the user to other appointments. For example, for a particular user-contact pair, the appointment server system may alternate which user travels farther by using the location of the user as the epicenter for even numbered meetings and the location of the contact for odd numbered meetings. In some embodiments, the appointment server system looks at the total distance traveled by the user in a given time period for appointments arranged by the appointment server system. As one example, a user has traveled a total of 50 miles for 4 appointments in the last month, a contact of the user has traveled a total of 5 miles for 4 meetings in the last month. In this example, the appointment server system will use the location of the user as the epicenter rather than the location of the contact, because the user has traveled greater distance recently.

After determining the epicenter, the appointment server system looks for appointment locations (e.g., a restaurant for a lunch appointment) within a given radius of the epicenter. In some embodiments, the type of appointment location (e.g., restaurant, coffee shop, state park, bar, etc.) selected by the appointment server system depends on the type of appointment. For example, a lunch meeting would be scheduled at a restaurant, while a pet-walking date would be scheduled at a dog park, and an after-work appointment would be scheduled at a bar.

In some embodiments, a travel radius is determined by looking at the travel preferences of the participant closest to the epicenter, or by using a ratio of the distance to the midpoint among the participants. In some embodiments, selection of an appointment location relies at least in part on users' declared preferences for different locations, considering factors such as how often the user has been scheduled for an appointment (e.g., a lunch) at a given location (e.g., a restaurant), how strongly the user prefers a given location, what the compatibility is between the respective participants' preferences for locations, how far the location is from the intended epicenter, and the like. In some embodiments, if the search for locations is unable to find a suitable location for the appointment from among the users' preferences, it will turn to appointment location rating service such as YELP or GOOGLE LOCAL, such as by using the Application Programming Interfaces (APIs) supplied by those services. It should be understood that if the appointment server system does not have location preference information for one or more of the users, then the appointment server system can select a location based on criteria that are not specific to any of the users (e.g., the rating of a restaurants within a predefined radius).

Additionally, in some embodiments, the appointment server system sets (432) a response deadline. In some embodiments the response deadline is a standard response deadline (e.g., 24 hours before the proposed appointment). In some embodiments, the response deadline is specified by appointment preference information provided by one of the participants (e.g., a user specifies that for all appointments where he is a participant he wants confirmation of the appointment one week in advance).

The appointment server system sends (434) an electronic message (e.g., email or SMS) to the first plurality of participants including an invitation to the proposed appointment. In some embodiments, once the appointment server system has determined who the participants are for an appointment, where the proposed appointment will take place, and when it will be, it sends an appointment invitation to the users. In some embodiments, this invitation and all subsequent updates to the invitation use a multipart email format which includes a text part, an HTML part, and a vcal or ical attachment. The vcal or ical attachment allows calendaring and email software such as OUTLOOK or GMAIL and GOOGLE CALENDAR to automatically insert the meeting invitation into the participant's calendar.

In accordance with some embodiments, for users who have previously received placeholders to reserve dates on their calendar, the meeting invitation is sent as an update to the placeholder instead of as a new invitation. This prevents confusion resulting from having both a placeholder and a meeting on the user's calendar at the same time. In some embodiments, the meeting invitations clearly indicate the response deadline, and ask users to click a link so that they can accept, decline, or update the meeting. In some embodiments, the appointment server system will also recognize the vcal and ical responses for accept, decline, tentative, and propose new time. Finally, in embodiments where information is available, the meeting invitation will provide the mobile phone and other contact details of the attendees so that users can contact one another should issues arise. In alternative embodiments, the meeting invitation may be relayed and presented to the user through other means, such as a text message, an instant messenger service, a social network's messaging capability like FACEBOOK, or through a custom client application (e.g., an IPHONE application, ANDROID application, or PALM application).

In accordance with some embodiments, the electronic message is sent by the appointment server system to a first participant of the plurality of participants includes an indication of a first travel time of the first participant to the first location; and the electronic message sent to a second participant of the plurality of participants includes an indication of a second travel time of the second participant to the first location. For example, for an electronic message (e.g., invitation) sent to a first participant by the appointment server system determines an approximate first travel time from the location of the first participant to the location of the appointment, while an electronic message sent to a second participant by the appointment server system includes a second travel time from the location of the second participant to the location of the appointment. In some embodiments the first and second travel times are determined by sending a query to an external travel time calculation program such as a web-based mapping program (e.g., GOOGLE MAPS or MAPQUEST). In some embodiments the first and second travel times are determined using a proprietary travel time prediction algorithm.

In some embodiments the provided travel time takes into account the time of day, day of week, likely traffic conditions at the time of the meeting, etc. In some embodiments this travel time is included in the invitation (e.g., "travel time to your appointment location is 15 minutes"). In some embodiments, driving directions are included along with the travel time. In some embodiments a map is included in the invitation. In some embodiments, at least one of the start time or the end time of the appointment is adjusted for one or more of the plurality of participants based on the predicted travel time for the respective participant to the appointment location. In embodiments where the electronic message includes an automatic calendaring part (e.g., a vcal or ical attachment) the automatic calendaring part includes start and end times adjusted based on the travel time. For example, when Participant A and Participant B are participants in an appointment that is lunch at a restaurant that is located 15 minutes from Participant A and 9 minutes from Participant B. In this example, the service schedules Participant A from 11:45 am to 1:15 pm, and Participant B from 11:51 am to 1:09 pm. It should be understood that, because the travel time is calculated as a function of the distance that a respective participant needs to travel to the location of the appointment, in accordance with this embodiment, the start time and end time of the appointment may be different for each user.

In some embodiments, the electronic messages include an option for a participant to invite one or more contacts to join the appointment.

In some embodiments a plurality of appointments are automatically scheduled by the appointment server system. In particular, in response to receiving (402) the appointment preference information from the first user, and optionally receiving (420) appointment preference information from a second user, the appointment server system automatically, without human intervention, schedules (436) a second proposed appointment based on the appointment preference information. In some embodiments, the second proposed appointment includes at least a second location, a second plurality of participants that are distinct from the first location and the first plurality of participants. In some embodiments, the second plurality of participants includes at least one participant that is not included in the first plurality of participants. In some embodiments, the second appointment includes the first user and a second contact of the one or more contacts, and a second date that was not selected by any of the second plurality of participants, wherein the second proposed appointment is not a recurrence of the first proposed appointment. As used herein, a recurrence of an appointment is an appointment with the same participants that occurs at regular intervals (e.g., on the same day(s) of the week for a plurality of weeks or the same day(s) of the month for a plurality of months) for substantially the same purpose. Thus, to say that the second appointment is not a recurrence of the first appointment means that the second appointment includes one or more of: one participant not included in the first appointment, a different location, occurs on a different day of the week, time of day, day of the month, or is for a different purpose. For example, having lunch with Participant A at Restaurant X instead of socializing with Participant B at Restaurant Y are not recurrences of an appointment even if they occur at the same time (e.g., 12:30 pm) on the same day of the week (e.g., the first Wednesday and the second Wednesday in April, respectively) or day of the month (e.g., the 15th of April and the 15th of May, respectively).

After determining the relevant details for the appointment, as discussed above in greater detail with reference to scheduling a first appointment, the appointment server system sends (438) an electronic message to the second plurality of participants, including an invitation to the second proposed appointment. It should be understood that in addition to scheduling a first appointment and a second appointment one or more additional appointments may be automatically, without human intervention, scheduled by the appointment server system using the process described above, wherein at least a subset of the one or more additional appointments does not include a recurrence of any of the previous appointments. For example, User A provides appointment preference information into the appointment server system including contact information for three friends and two co-workers. The appointment server system schedules User A for five lunches over the course of the subsequent month, where each lunch is with a respective friend or co-worker, and the lunches are scheduled in accordance with the availability of User A and the friends and co-workers of User A.

After invitations to the proposed appointment have been sent out, the appointment server system waits to receive replies from the invited participants. In some embodiments, the appointment server system receives a reply from at least a one of the participants that is an acceptance of the appointment (e.g., "I will attend the appointment"). If the reply is (450) an acceptance then the appointment server system checks to see whether it has received a sufficient number of acceptances to confirm the meeting. If the appointment server system has (452) received a predefined threshold (e.g., a sufficient number or sufficient percentage) of acceptances to confirm the meeting, then in some embodiments the appointment server system sends (454) an electronic message (e.g., an email or SMS) to each of the plurality of participants including a confirmation of the first proposed appointment. In some embodiments the predefined threshold is an acceptance from at least one participant other than the first user. In some embodiments, the predefined threshold is an acceptance from at least half of the participants. In some embodiments, when scheduling an appointment with more that two participants, the predefined threshold is that more than two acceptances must be received. In some embodiments this threshold is part of the appointment preference information specified by the user.

It should be understood that there are many different possible embodiments for receiving an acceptance from a participant, including without limitation: an email with a vcal or ical response, a selection on an interactive website, a social networking website application (e.g., a FACEBOOK application), a mobile device application (e.g., an IPHONE application), an instant messaging service, a text message, or any other reply means known to one skilled in the art. In accordance with some embodiments, if the user includes any notes (e.g., "look forward to having lunch with you") with his or her acceptance, then these notes are added to the meeting notes for the invitation and included in all messages sent to appointment participants regarding this appointment.

In some embodiments, participants are permitted to provide tentative responses (e.g., "maybe"). If the appointment server system receives a tentative response from a participant through any of the channels described above, the participant's response is set to tentative, and, if this is different than the user's previous response, a revised appointment invitation is sent to the participant. If the user includes a note with their response, then revised meeting invitations may be re-sent to all members with the note included.

In some embodiments, a confirmation (e.g., an email stating that the appointment has been confirmed) is sent to each participant along with an updated appointment invitation one week prior to the appointment. In some embodiments a confirmation is one or more of the following: an email, a text message, proprietary social network message, instant messenger message, and/or a notification sent through a custom client application (e.g., an IPHONE application). It should be understood that different participants for the same meeting may each receive a confirmation for the same meeting using a different type of confirmation message (e.g., a first participant receives a confirmation email and a second participant receives a text message). It should also be understood that a single participant could receive multiple confirmations for the same meeting using a plurality of the types of confirmation messages (e.g., a first participant receives both a confirmation email and a confirmation text message for the same appointment). In some embodiments, a confirmation is only sent to the participants who have accepted the appointment. In some embodiments, a confirmation is only sent to the participants who have accepted or tentatively accepted the appointment. In some embodiments the confirmation is sent to all of the participants who have not declined the appointment.

In some embodiments, sending an electronic message to the plurality of participants includes booking (455) a reservation for the appointment at the first location. For example, when the appointment is for User A and User B to have lunch at Restaurant X for 12:30 pm on Apr. 15, 2009, the appointment server system makes a reservation at Restaurant X at the specified time. In some embodiments booking a reservation includes contacting the appointment location directly with the appointment information (e.g., sending an email to Restaurant X). In some embodiments booking a reservation includes using a third party reservation application (e.g., OPEN TABLE) to create a reservation using the appointment information.

In some embodiments, if the appointment server system has not (456) received sufficient acceptances to confirm the appointment, or the reply received by the appointment server system was not (458) an acceptance, then the appointment server system does not send a confirmation to the participants.

In some embodiments, if the reply indicates (460) an updated location, date or time, the appointment server system resets (462) the response status (e.g., "accept," "reject," "tentative" or "no reply" are all reset to "no reply") for all participants other than the participant who sent the reply with the updated location, date or time, and resends the invitation to the other participants. For example, Users A and B have accepted an appointment when User C proposes a new time for the appointment, and the appointment server system changes the appointment to a new time and sends out a revised invitation indicating the new time. In this example, Users A and B have not confirmed that they can attend at the new time, and so their responses are reset to "no reply."

In some embodiments, when the location, date and time are not (464) updated, the appointment server system checks to see if a note has been added by the reply. If a note is (466) added to the appointment by the reply, (e.g., "I'll bring a copy of my proposal to our lunch meeting"), then the appointment server system sends (468) an invitation to all participants, where the invitation includes the note, while preserving the response status for each of the participants. For example, if Users A and B have accepted an appointment, when User B sends a note for the appointment, the appointment server system sends an invitation to User A including the note, but does not reset the response status of User A, because the details (e.g., time, date, location) of the appointment have not changed.

In some embodiments, the reply received from the participant indicates (472) a rejection of the first proposed appointment. In some embodiments, the appointment server system marks (474) the rejecting participant as unavailable for the appointment time. For example if User A rejects (e.g., declines) an appointment at 12:30 pm on Apr. 15, 2009, it is likely that User A has a conflicting obligation and thus the appointment server system will avoid attempting to schedule any further appointments for that time by marking the participant as unavailable at that time. In some embodiments, a cancellation message is sent to the participant who rejected the appointment in addition to marking the participant as unavailable for that time.

In some embodiments other appointment preference information for the participant is also updated. For example, if the appointment was for a restaurant, and the participant has previously rejected an appointment at the same restaurant, the participant's appointment preference information may be changed to indicate that the user does not like that restaurant and thus will not automatically schedule other appointments at that location. It should be understood that other appointment preference information (e.g., user ratings, time of day preferences, willingness to travel) can be automatically determined in this manner. In some embodiments when a participant rejects an appointment, the participant is given a number of options for indicating why the appointment was rejected (e.g., "too early" "too late" "too long" "too far away" "I don't like the location," etc.).

In some embodiments when sufficient (476) rejections (e.g., declines) have been received from a predefined threshold of the participants, the appointment server system sends an electronic message to a plurality of the participants including a cancellation of the first proposed appointment. In some embodiments the plurality of participants includes all participants for the appointment. In some embodiments, the plurality of participants includes only the participants for the appointment who have accepted the appointment. In some embodiments the plurality of participants includes all of the participants for the appointment who have not rejected the appointment.

In some embodiments the predefined threshold of rejections is reached if, as a result of the received rejection, there are not at least two participants who can confirm their attendance at the appointment. When the predefined threshold is reached, cancellations (e.g., electronic messages indicating that the appointment has been cancelled) are sent to all members who have not already received a cancellation. For example, if there are four participants invited to an appointment and one of the participants has accepted the appointment while one of the participants has rejected the appointment, the appointment is not cancelled until the other two participants reject the appointment. In some embodiments, the predefined threshold of attendees is greater than two, in which case, if there are fewer participants than the predefined threshold capable of accepting the appointment (e.g., if all attendees who have not rejected the appointment accepted it, the appointment would not meet the predefined threshold of participants), then the appointment is cancelled. In some embodiments, if the rejecting participant included a note with their rejection of the appointment, then this note is included in all invitations and cancellations associated with the appointment. In some embodiments the predefined threshold is a percentage of the invited participants (e.g., 25% or 50%) rather than a fixed number. In some embodiments this threshold is part of the appointment preference information specified by the user.

If the predefined threshold of rejections is (476) met, then a cancellation is sent (477) to a plurality of the participants. In some embodiments the plurality of participants is all of the participants, in some embodiments the plurality of participants is all participants who have not yet received cancellations. If there are not (478) sufficient rejections to cancel the appointment (e.g., the predefined rejection threshold has not been met), or if the reply is not (480) a rejection the appointment server system checks to see if the response deadline has been reached. If the response deadline has not (482) been reached, then the appointment server system waits for additional replies for the appointment or for the response deadline to be reached. In some embodiments the appointment server system periodically checks (e.g., twice a day) to determine if the response deadline for any of the appointments has been reached.

If the appointment deadline has (484) been reached, the appointment server system checks to determine whether there are enough acceptances to confirm the meeting. If replies indicating an acceptance of the appointment have not (486) been received from at least a predefined threshold of the participants (e.g., at least two or at least half of the invited participants) before a predefined time period has elapsed (e.g., twenty four hours before the start time of the appointment), the appointment server system sends (477) a cancellation. In some embodiments a cancellation of the appointment is an electronic message indicating that the appointment has been cancelled. In some embodiments sending the cancellation to a plurality of the participants includes sending the cancellation to all participants who have accepted the appointment. In some embodiments sending the cancellation to a plurality of the participants includes sending the cancellation to all participants who have not already received a cancellation for the appointment.

If the appointment server system determines that the response deadline has (484) been reached and the appointment server system also determines that the predefined threshold of acceptances has (488) been reached (e.g., at least two participants have accepted), then the appointment server system sends (454) a confirmation to all parties who have accepted, as discussed in greater detail above.

In some embodiments, the appointment server system periodically receives location information (e.g., global positioning service data or wireless signal triangulation data) from a client system that is a mobile device. In some embodiments this location information is associated with a time that the location information was acquired. The appointment server system uses this time-specific location information to determine the likely location of the user at a particular time of day or day of the week. In some embodiments this likely location information is stored as appointment preference information for the user. For example a user has a cell phone with a global positioning service (GPS) location module or cell tower triangulation module; at 12:30 pm each day, an application on the cell phone associated with the appointment server system records the location from the GPS module. In this example, the cell phone periodically sends this information to the appointment server system and the appointment server system uses this information to identify the workplace of the user during the week and the appointment sever uses that location as the user's location for the purposes of selecting locations for the user's weekday appointments that occur around 12:30 pm (e.g., lunches with coworkers).

In accordance with some embodiments, reminders are sent as updated appointment invitations to each participant who has not responded at least twenty four hours before the response deadline for the appointment. In some embodiments the appointment preference information includes a parameter to adjust this reminder period. In some embodiments, the appointment server system uses a built-in alert function within a calendar event standard (e.g., the ical or vcal format) to embed reminders into the appointment invitations. In accordance with this embodiment, the electronic calendars of the participant will display a reminder to the user at one or more predetermined times before the appointment. In some embodiments, the predetermined time is a default predetermined time of a calendar application such as OUTLOOK or an online calendar application, such as GOOGLE CALENDAR or YAHOO CALENDAR. In some embodiments the user sets a custom predetermined time. It should be understood that reminders may also be sent through other channels including text messages, social networks, instant messengers, and custom client applications like (e.g., IPHONE applications).

Scoring

Attention is now directed towards FIGS. 5A-5F, which illustrate a method for handling appointment preference information in accordance with some embodiments. In accordance with some embodiments, the appointment server system constantly re-evaluates the compatibility of users with one another for appointments. In accordance with some embodiments, an appointment is selected based on a calculated total score. In some embodiments there are two or more times at which a total score is generated. In accordance with some embodiments, the first time is prior to deciding which users to group together for an appointment, and the second time happens when deciding on a specific time for an appointment among a first plurality of participants.

In accordance with some embodiments, scoring is as a pair-wise operation, looking at each user-contact combination. In some embodiments, appointments are automatically, without human intervention, scheduled between more than two participants by employing additional scoring factors, as described in greater detail below.

In some embodiments, the scoring function builds a total score by creating a score for several discrete components (e.g., contact score, user rating score, location score, schedule score, behavior score, and/or date elimination score) of a user-contact pair. In some embodiments, the appointment server system multiplies each score component by a specific coefficient. These coefficients serve the purpose of weighting different components of the ranking process to improve the accuracy of the total score in automatically selecting appointments that the participants in the appointment (including the user) will be more likely to accept. In some embodiments the score component coefficients are equally weighted. In some embodiments the coefficients are each weighted based on predefined value that is representative of a predetermined relative importance of each component score to the total score (e.g., the time of day is generally twice as important as the location). For example, a study of how users interact with the appointment server system over time may prove that the "user rating component score" is more relevant to arranging the best match for an upcoming appointment. The coefficient for this component can be adjusted upward so that the "user rating component score" has a greater influence on the overall score.

In some embodiments, the appointment server system keeps track of the acceptances and rejections of appointments by the user as well as component scores for each automatically suggested appointment. In some embodiments, the coefficient for each component is an arbitrary value used to give greater or lesser weight to the individual score component. In some embodiments the coefficients are adjusted on a per-user basis based on how accurately the different score components have predicted whether the user will accept the appointment based on past acceptances of similar appointments. If a score component is a poor predictor of whether a user will accept an appointment, then the coefficient is reduced. If a score component is a good predictor of whether a user will accept an appointment, the coefficient is increased.

It should be understood that a variety of statistical models for determining whether a score component is a good predictor of a user accepting an appointment may be used. Such statistical models would be readily apparent to one having ordinary skill in the art. While this example suggests a dependent variable of whether a user accepts or rejects a meeting, it should be understood that a different dependent variable may be employed when optimizing the coefficient weights. For example, explicit user ratings or feedback (e.g. a follow up email asking the user if they enjoyed their lunch), may be used instead. In some embodiments, the coefficient is determined using a multiple-x regression based on least squares. In some embodiments, users control their own coefficients so that they can adjust how the scoring process evaluates the appointment preference information associated with the user, e.g., by indicating an importance for each category 1-10 or by moving a slider between "less important" and "more important." In some embodiments, the component scores are adjusted using the coefficients and are combined to generate the total score for the user-contact pair, as described in greater detail below.

In some embodiments, the appointment server system generates a contact score (501) for each user-contact pair. In accordance with some embodiments, the appointment server system first checks whether the contact of the user-contact pair has provided a rating for the user. If the contact has not (502) provided a rating for the user, a default score is used (503) for the contact rating component. The default score is adjusted (504) using the contact score coefficient For example, a default score may be set to "rarely" or an ordinal equivalent of "2" by the appointment server system in the absence of better information. In some embodiments a default score for unrated contacts is set by a user. For example, one user may prefer that all the contacts that she has not given a rating be given a default value of "one appointment only" or an ordinal equivalent of "1". In some embodiments, defaults contact scores are derived from other available information. For example, the appointment server system may have access to the user's "social graph," meaning the information about what contacts the user is connected to via different social networks (e.g., friends, family coworkers, social contacts) and the number of contacts (e.g., a contact is connected to the user as a friend and a co-worker) and the degree of contacts (the contact is a friend of a friend of a user, or the contacts work for the same company). In some embodiments the appointment server system generates an "index of connectedness" for the user-contact pair, using factors such as the number of shared contacts, or duration of time worked for a common employer, or the amount of time spent at the same school, and the like. In some embodiments, if a contact is connected to the user on multiple social networking websites (e.g., the contact is a friend of the user's on FACEBOOK and on LINKED IN) then the "index of connectedness" is higher for that contact. In this embodiment, the appointment server system uses the "index of connectedness" to set a default contact score for each user-contact pair, or to adjust the contact score for each user-contact pair.

In accordance with some embodiments, if the contact has (505) provided a rating for the user, then this rating is used for the component score using the following logic. If the contact has indicated that they never (506) want to have an appointment with the user, then the total score is set (507) to zero and scoring is completed for this user-contact pair. If the contact rating of the user is not (508) "never," but the contact has (509) requested an appointment frequency cap, such as "one appointment only," and this has (510) been exceeded, then the total score is set (507) to zero and scoring process is terminated for this user-contact pair. Otherwise, if there is no (511)

requested frequency cap or the requested frequency cap has not (512) been exceeded, the score for this component is generated (514) as a function of the contact's desired frequency to meet with the user. In accordance with some embodiments, when the contact appointment frequency indicates that appointments should be scheduled frequently with this user (e.g., a rating of "often"), the contact rating score is set to 100, while when the contact appointment frequency indicates that appointments should be scheduled infrequently (e.g., a rating of "rarely"), the contact rating score is set to 25. In accordance with some embodiments component score is adjusted (504) (e.g., multiplied) by the contact rating coefficient and combined with (e.g., added to) the total score.

In accordance with some embodiments, a user rating score is calculated (516). If the user has indicated that they never (518) want to have an appointment with the contact, then the total score is set (519) to zero and scoring is terminated. In some embodiments, even if the user rating of the contact is (520) a value other than never, the user requested a frequency cap, such as "one appointment only", and this has been exceeded (521), then the total score is set (519) to zero and scoring is terminated. In accordance with some embodiments, even if the frequency cap has not (522) been exceeded, if the user and the contact already have an appointment scheduled (524) at any point in the future, the total score is set (519) to zero and scoring is terminated. In accordance with some embodiment if there is no (525) proposed appointment (e.g., the user and the contact are not yet scheduled for a lunch) and instead a default score is used (526) for the user rating component score, parallel to the default rating score described in greater detail above.

In accordance with some embodiments, if the total score is not set to zero, the appointment server system creates a component score by first calculating (531) the ideal appointment frequency for the user-contact pair. As one example, illustrated in FIG. 6A, the user has asked to have a lunch appointment with 2 contacts "once only", 3 contacts "rarely", 1 contact "average", and 4 contacts "often", as noted in column A 602 and column B 606. Column C 608 is a multiplier which is used to give greater importance to contacts with higher preferred appointment frequencies. In this example, the multiplier used in Column C is an arbitrary value that can be adjusted to widen or tighten the meaning of the user ratings. For example, if the multiplier for "often" were increased to 5, then all users who specified an appointment frequency of one or more contacts as "often" would be scheduled to meet with those contacts more frequently at the expense of contacts with a lower appointment frequency in the other categories. Column D 610 represents the weight for a given appointment frequency, such as "rarely" or "often", and is calculated by multiplying B×C. Column E 612 shows the desired distribution of appointments for a contact within a given category and is calculated as C divided by the total of D. For example, this user will be scheduled with each "rarely" rated contact for 6.74% of his/her appointments. Column F 614 is the inverse of Column E (1/E) and represents the ideal appointment (e.g., lunch) frequency measured as the number of appointments (e.g., lunches) to wait before scheduling another appointment (e.g., lunch) between the user and the contact. Continuing the example, the user should be scheduled for an appointment with each "rarely" rated contact once for every twenty two times that the user is scheduled for an appointment. Similarly, each contact who has been rated "often" should be seen approximately every seven appointments (e.g., lunches).

Once this ideal appointment frequency for the user-contact pair is calculated, the appointment server system generates (532) a user rating component score by comparing the ideal frequency to the frequency that would result if an appointment were scheduled in a week. The formula 616 in FIG. 6B illustrates one embodiment of such a comparison, which begins by determining the number of appointments (e.g., "$[t_{UC} \times a/m]$" in FIG. 6B) the user has had since the last appointment including both the user and the contact. In some embodiments, this value is determined by looking at the last date that the user and the contact had an appointment, and deriving the difference, in months (e.g., "$t_{UC}$" in FIG. 6B), between the last appointment date and one week from the current date (e.g., the scoring process is being run on Apr. 10, 2009, the date one week from the current date is Apr. 17, 2009). This time period (e.g., "$t_{UC}$" in FIG. 6B) is multiplied by the average number of appointments that the user has each month (e.g., "a/m" in FIG. 6B).

For example, if the user and the contact last had an appointment 5 weeks ago, then the time between then and one week from now is 6 weeks, or 1.5 months (e.g. $t_{UC}=1.5$ months in FIG. 6B). Assume that the user has 4 appointments per month on average (e.g. a/m=4 in FIG. 6B), meaning that 4×1.5=6 lunches have passed since the user and the contact had lunch (e.g. $[t_{UC} \times a/m]=6$ in FIG. 6B). Then the formula takes the difference between this and the ideal appointment frequency (e.g., "I" in FIG. 6B) for the contact. So, assume that this contact is in the "average" rating category, with an ideal frequency to meet every 10 appointments (e.g. I=10 in FIG. 6B). Thus, subtracting 10 (I) from 6 ($[t_{UC} \times a/m]$) results in a −4, which is then added to some average score value (e.g., "$S_A$" in FIG. 6B), such as 50 to arrive at a component score of 46. One can see that the more time passes since the last appointment between the user and the contact, the higher this score will become. The schedule component score (e.g., "S" in FIG. 6B) is modified (e.g., multiplied) by the user rating coefficient and combined with (e.g., added to) the total score.

It would be readily understood by one having ordinary skill in the art that any number of alternative methods can be used to decide how to best match the potential participants for a given appointment to achieve a the desired result. The most simple of these is randomization. The most complex of these, similar to the embodiment described above, attempts to draw on a user's preferences and translate those preferences into a pattern of appointments with different participants.

In accordance with some embodiments, a location score (530) is calculated. In accordance with some embodiments if either the user's location is unknown (532) or the users location is known (536) and the contact's location (538) is unknown, then a default value is assigned (533) for the location component. In some embodiments the default score is set to a midpoint (e.g., 50 when the score range is 0 to 100 for each component score). In accordance with some embodiments the location score is modified (e.g., multiplied) by a location coefficient and combined with (e.g., added) to a total score.

In some embodiments, if the location of the user is known (536) and the location of the contact is known (539), then the distance that each participant (e.g., the user and the contact) will be required to travel to get to the appointment location is calculated. This process begins by calculating (540) the distance between the user and the contact. If the distance exceeds (543) a maximum distance threshold (e.g., is too far), for example 10 miles (or the sum of the maximum willingness to travel specified by the user and the contact), then the total score is set (544) to zero and the scoring process is terminated for this user-contact pair. In accordance with some embodiments, the maximum distance threshold is represents a distance beyond which it is not feasible for two parties to meet one another for an appointment, even if each participant traveled halfway. It should be understood that in some embodiments the maximum threshold distance varies with the type of appointment (e.g., 5 miles for a lunch, 10 miles for a dinner, and 50 miles for a day-long retreat). For simplicity, this embodiment uses a fixed distance of 10 miles. In some embodiments, this maximum distance threshold could vary by geography, and could be adjusted for things like local speed limits, common transportation options, expected traffic around the time of the appointment, as well as travel expenses (e.g., gas or public transportation costs).

In some embodiments, the appointment server system determines (546) an epicenter for the appointment (e.g., an approximate location for the appointment). The location of an epicenter can be determined based on a number of factors including whether the user or the contact traveled further the last time the user and the contact had an appointment. For example, the appointment server system could alternate between making the user travel further and making the contact travel further. In some embodiments, once the appointment server system has determined an epicenter for the appointment, it then evaluates the distance that the user needs to travel against the user's travel preferences. If the distance is greater (549) than the user is willing to travel (e.g., too far), then the component score is set to zero. Otherwise (550), the location component score is generated (552) as a function of the distance traveled, with a smaller distance scoring higher. For example, if an epicenter is a midpoint between two users who are relatively far from each other, and one user is only willing to travel 25 miles for a lunch "rarely", and did so last week, then the score would be set to zero until enough time had passed that the user had the appetite to travel that far again.

One example of a simple function for calculating this score is to start with a score of 100 and deduct 1 point for every mile that either user must travel. For example, if the travel distance that each user needs to travel is 0 because both users work in the same building, and that building has a café, then the component score will be set to 100 by the appointment server system. On the other hand, if each user must drive 25 miles to a restaurant located between them, then the component score is set to 50. One having ordinary skill in the art would readily appreciate other methods for calculating such a score. In accordance with some embodiments, the component score is modified (e.g., multiplied) (534) by the location coefficient and combined with (e.g., added to) the total score.

In accordance with some embodiments a schedule score (554) is calculated. In accordance with some embodiments, if the user's availability is unknown (556), then the total score is set (558) to zero and the scoring process is terminated for this user-contact pair. If the user's schedule is known (560) and the contact's availability is unknown (562), then a default value is used for the schedule component score. In this embodiment, the default value is set (564) to the midpoint of the potential range for this component score; (e.g., 50 when the score range from 0 to 100). In accordance with some embodiments, the schedule score is modified (e.g., multiplied) (566) by a schedule coefficient and combined with (e.g., added to) the total score.

In accordance with some embodiments, if the user's schedule is known (560) and the contact's schedule is known (568) but the user and the contact do not (569) share any common available appointment times, then the total score is set (558) to zero and the scoring process ends. Otherwise if the user and the contact do share (570) at least one common available appointment time, a score is generated based on the nearest intersection of availability between the two participants (e.g., the user and the contact). In some embodiments, higher scores are given to dates that occur closer to the current date within a predetermined time period (e.g., one week or one month) from the date on which the score is being calculated. As one example, the predetermined time period is seven days from the current date through sixty days after the current date. In this example, if the first intersection of availability between the two participants is on day twelve of the predetermined period, the schedule score is generated by multiplying 100 times 1 minus the fraction of the number of days to the first intersection divided by the range of the days considered. In this case, this would be 100*{1−[(12−7)/(60−7)]}, or 90.56. Thus, in some embodiments (as in this example) appointments which are scheduled in the near future are given a higher score than appointments which are scheduled further in the future.

In accordance with some embodiments, a behavior score (574) is calculated. In accordance with some embodiments the appointment server system considers the behavior of the user, the contact, or both when generating a score for a given user-contact pair. In some embodiments the historic number (or percentage) of rejections and acceptances for appointments scheduled between the specific user-contact pairing is used to generate (576) a behavior score. In accordance with some embodiments the score is adjusted (578) based on one or more of the participants' number (or percentage) of rejection of appointments scheduled on a particular day of week such as Wednesdays, or the number (or percentage) of rejections for appointments scheduled on a set date or range of dates within each month (e.g., the first full week of the month). In some embodiments the score is adjusted (580) based on one or more of the participants' historic acceptances and rejections of appointments at a particular location. It should be understood that other user attributes may also be considered, such as how long the user has used the appointment server system, whether the user has set up a recurring availability or has only selected individual dates for his/her availability, and whether the user is generally responsive to meeting requests. In some embodiments, the behavior score is modified (e.g., multiplied) (582) by a behavior coefficient and combined with (e.g., added to) the total score.

In accordance with some embodiments, a score is evaluated twice. The first time, a score is calculated in order to assess the general compatibility of each user pair without regard to scheduling a specific date. The scheduling batch then uses the results of these user pair scores to decide which user-contact pairs are the best matches for an appointment, at which point the score is re-evaluated with a specific date planned for each user pair. Sequencing the score creation and scheduling in this way ensures that appointment dates are not booked for poor matches ahead of better matches. In accordance with some embodiments if a score is being generated for a specific date the specific date component is evaluated (584). If a score is not (586) being generated for a specific date, then the total score is recorded (587) and the scoring process ends. In accordance with some embodiments, this evaluation has a binary outcome in which the total score will either be set to zero and the scoring process for this user-contact pair will be terminated, or it will allow the scoring process to continue. If the appointment is being calculated for a specific date (588), and the appointment server system has already tried to schedule (590) an appointment between the user and the contact for this date, and that appointment was cancelled, then the total score is set (591) to zero and the scoring process is terminated. Similarly, if the appointment server system has not (592) already tried to schedule an appointment between the user and the contact for this date, but the specific date is (594) a holiday or is near a holiday for either of the participants, then the appointment server system will set (591) the total score to zero and the scoring process is terminated. Otherwise if the appointment server system has not (592) previously tried to schedule the user and the contact for an appointment on the specific date and the date is not (596) holiday for any of the participants, then the total score is recorded (587).

In accordance with some embodiments, the total score for the user-contact pair represents the sum of all the individual component scores multiplied by each of the component score coefficients. In some embodiments, the total score for the appointment between the user-contact pair at the selected location on the selected date is stored on the appointment server system. If the total is zero, then the appointment server system will not schedule an appointment between the two users.

Group Rating

In accordance with some embodiments, appointments are scheduled between groups including three or more participants. Creating a score for an appointment for a group of three or more participants is similar to the evaluation of user-contact pairs, discussed in greater detail above with reference to FIGS. 5A-5F. In one embodiment, the contact is simply replaced with the group so that a score is created for each user-group pair. In accordance with some embodiments, a group is treated as a single entity and the appointment server system assesses a user's likelihood of accepting an invite for the group rather than the user's likelihood of accepting an invite from each other member of that group. For example, assume that User A belongs to a Group 123. The appointment server system can generate a score for the "User A-Group 123" pair. In accordance with some embodiments, this score is used as to determine the likelihood that the user will accept an appointment with the group (e.g., how important the group is to the user). In accordance with some embodiments, group appointments are created by trying to best accommodate the top scoring group-member pairs, up to the maximum appointment size (e.g., a size specified by one or more of the group participants or a default group size).

Figure 5A:
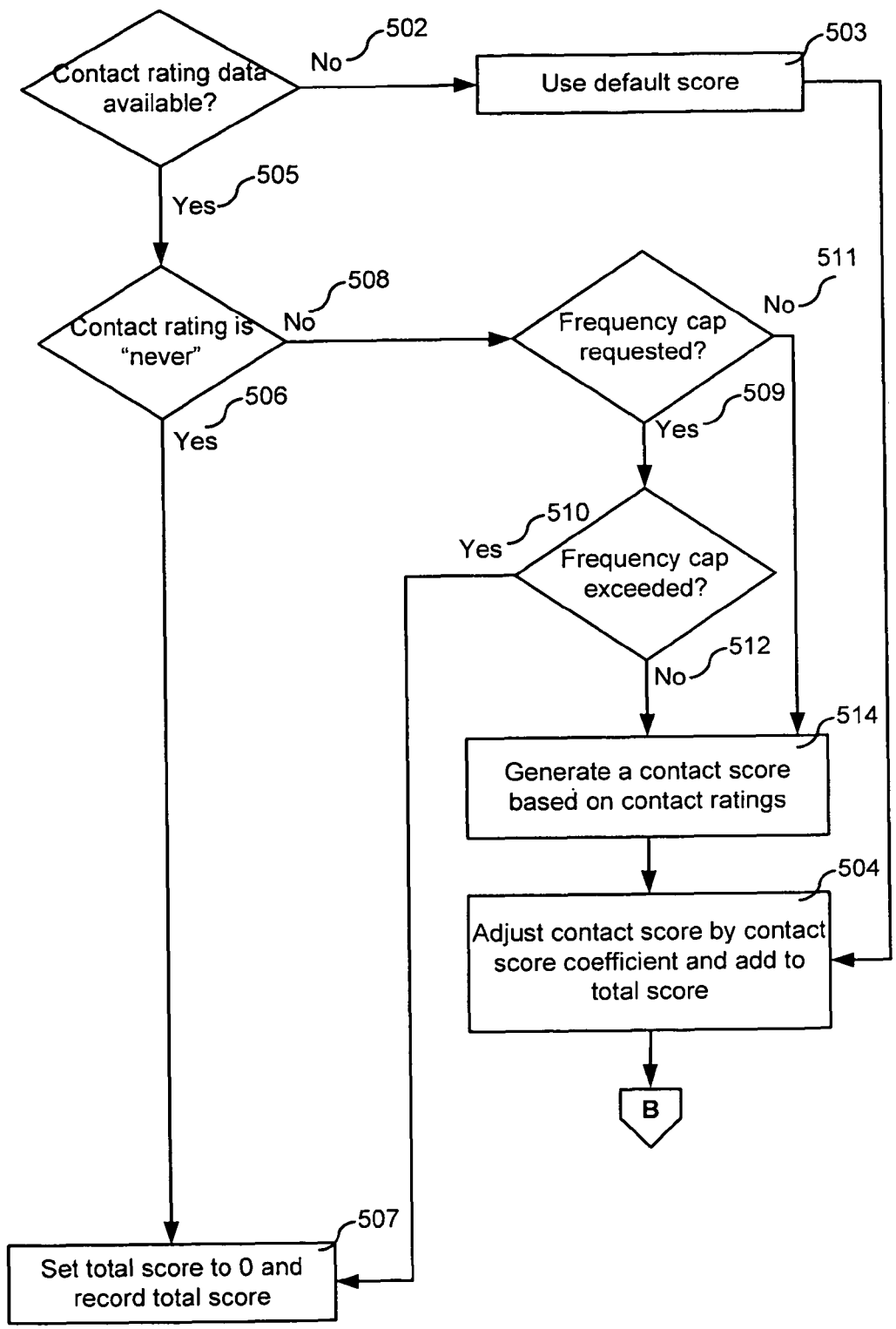
FIGS. 5A-5F are flow diagrams illustrating a process for scoring various components for use in automatically scheduling appointments in accordance with some embodiments.

In accordance with some embodiments, the "contact rating score" described in greater detail above with reference to FIG. 5A is a "member rating score", and is determined by the rating that the group member gave for the group. This is similar to the "contact rating score" described previously, in which a user can rate a contact in terms of how frequently the user would like to have an appointment with that contact. In the same way, a user can indicate how frequently they want to participate in (e.g., have an appointment with) each group for which they are a member. In some embodiments the frequency rating is turned into a score where "frequently" corresponds to a component score of 100, while "rarely" corresponds to a component score of 25. In some embodiments, these scores are modified (e.g., multiplied) by a member rating coefficient and combined with (e.g., added to) the total score for the group-member pair.

Figure 5B:
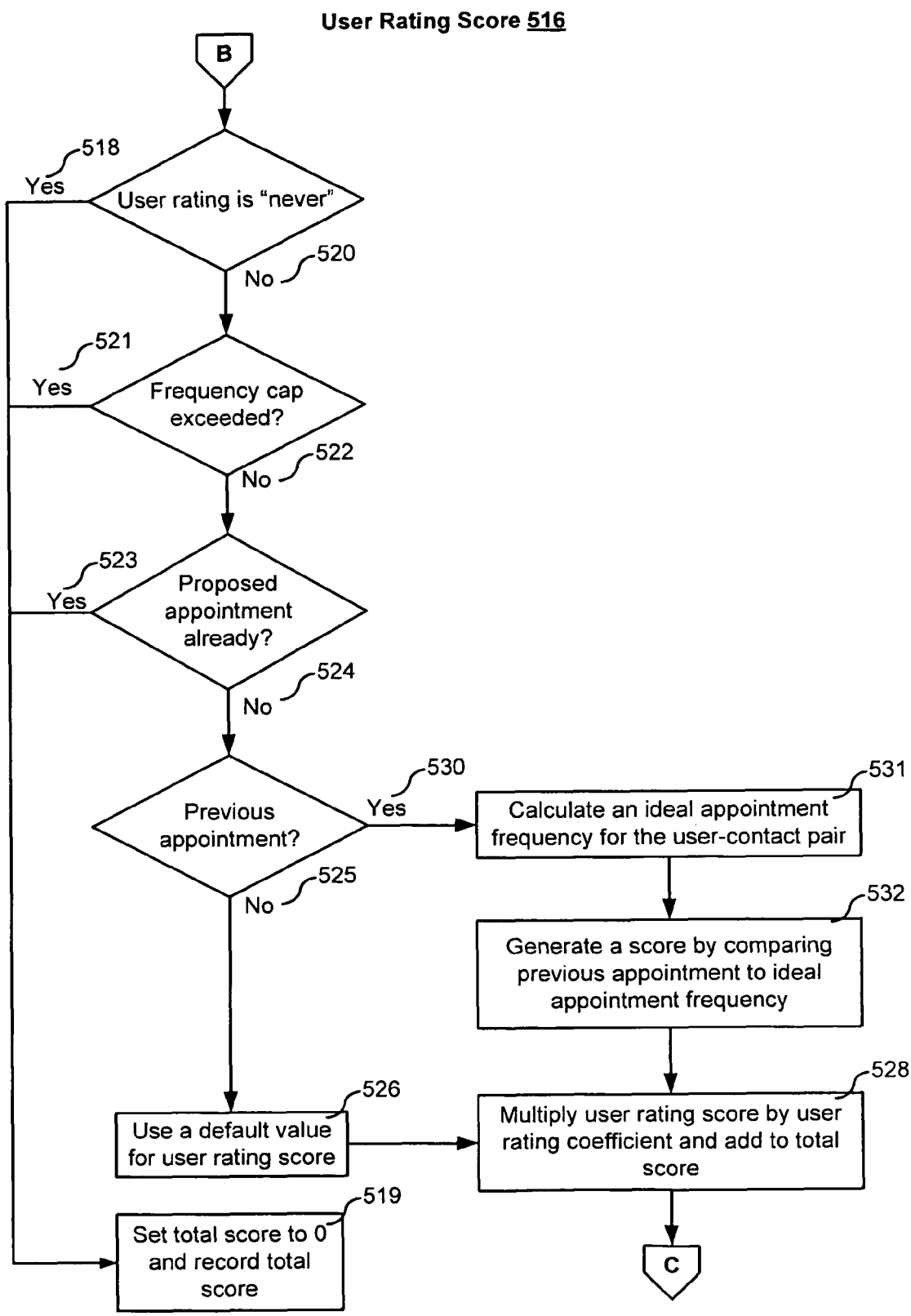

In accordance with some embodiments, the "user rating component" described in greater detail above with reference to FIG. 5B is a "group rating component" and determines the ideal appointment frequency for its members based on group data such as the size of the group, the maximum size for each appointment within that group, the number of concurrent appointments, and the like. In some embodiments the appointment server system compares the ideal appointment frequency to the actual appointment frequency for each member to arrive at an appropriate component score for the specific group-member pair.

Figure 5C:
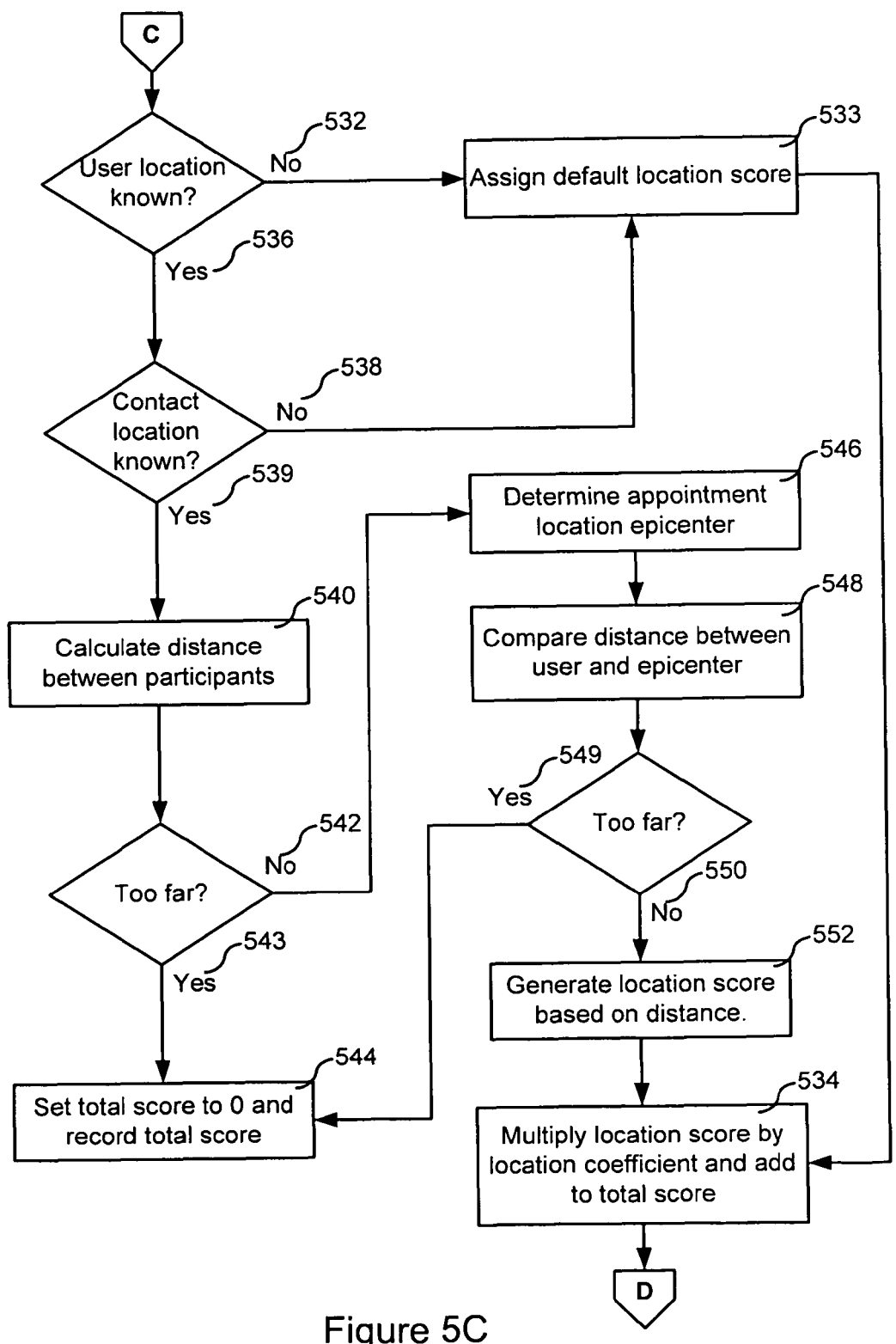
Figure 5D:
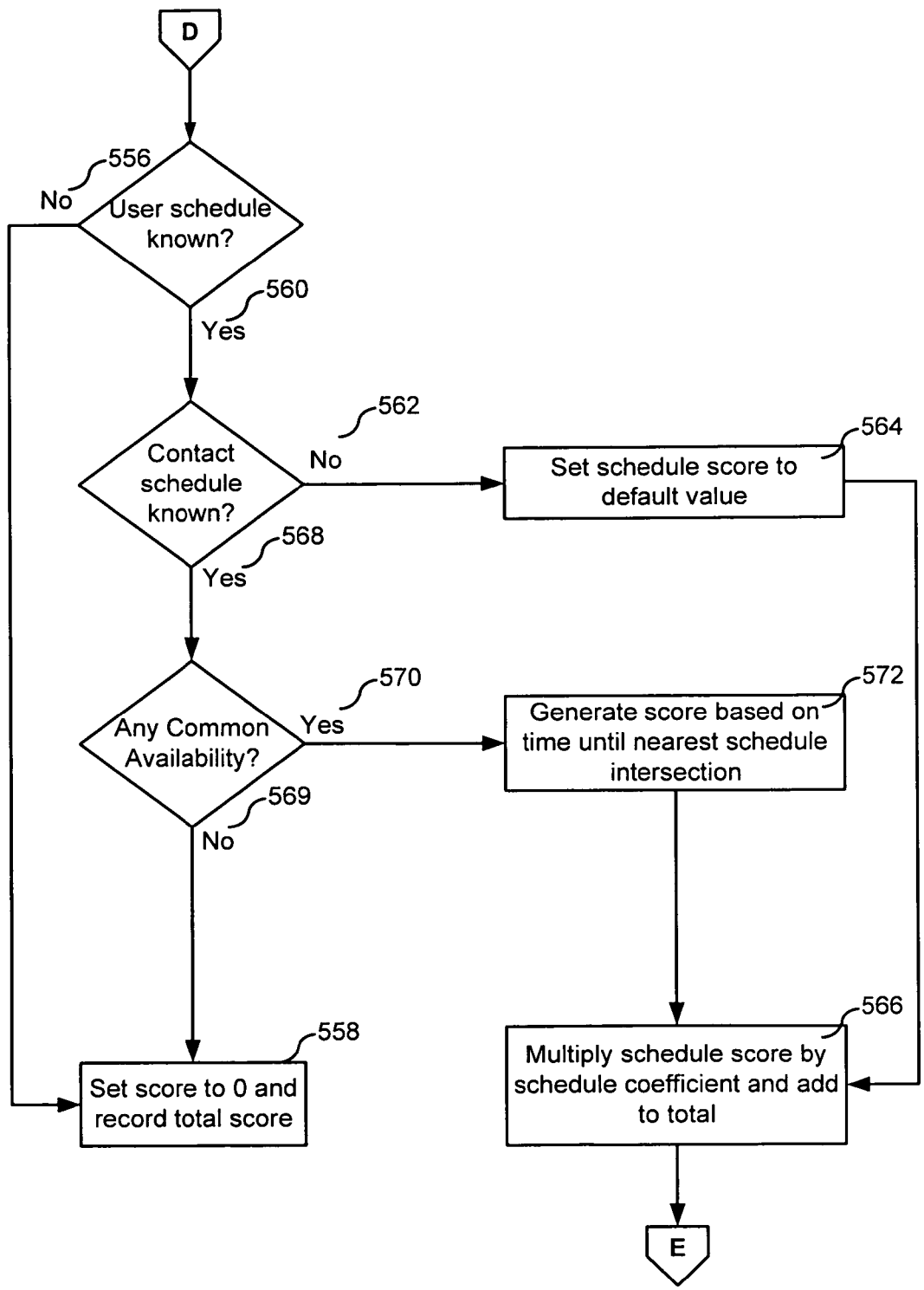

In accordance with some embodiments the location component score is calculated as described in greater detail above with reference to FIG. 5C, the scoring process evaluates whether any geographic constraints are placed on the group by the group owner (e.g., a user who creates a group with predetermined parameters and potential participants). In embodiments where there is no group owner or the group owner has not placed any geographical constraints on the group location, the appointment server system selects a location epicenter for the group based on the geographic distribution of its members. In some embodiments the group location scoring progress avoids selecting the same epicenter for a currently proposed appointment as was selected for a previously proposed appointment (or previously scheduled appointment). In accordance with some embodiments each group member's travel preferences are compared to the selected epicenter to come up with an appropriate location component score for each user-group pairing.

In accordance with some embodiments, if the group owner has provided date constraints for the group, then the appointment server system will select a potential date for the next group appointment based on this information. Otherwise, if there is no group owner or the group owner has not provided date constraints, the appointment server system will select a date based on the availability of all the group members. In accordance with some embodiments the appointment server system assesses individual user-group pairs to come up with an individual component score for each participant.

Figure 5E:
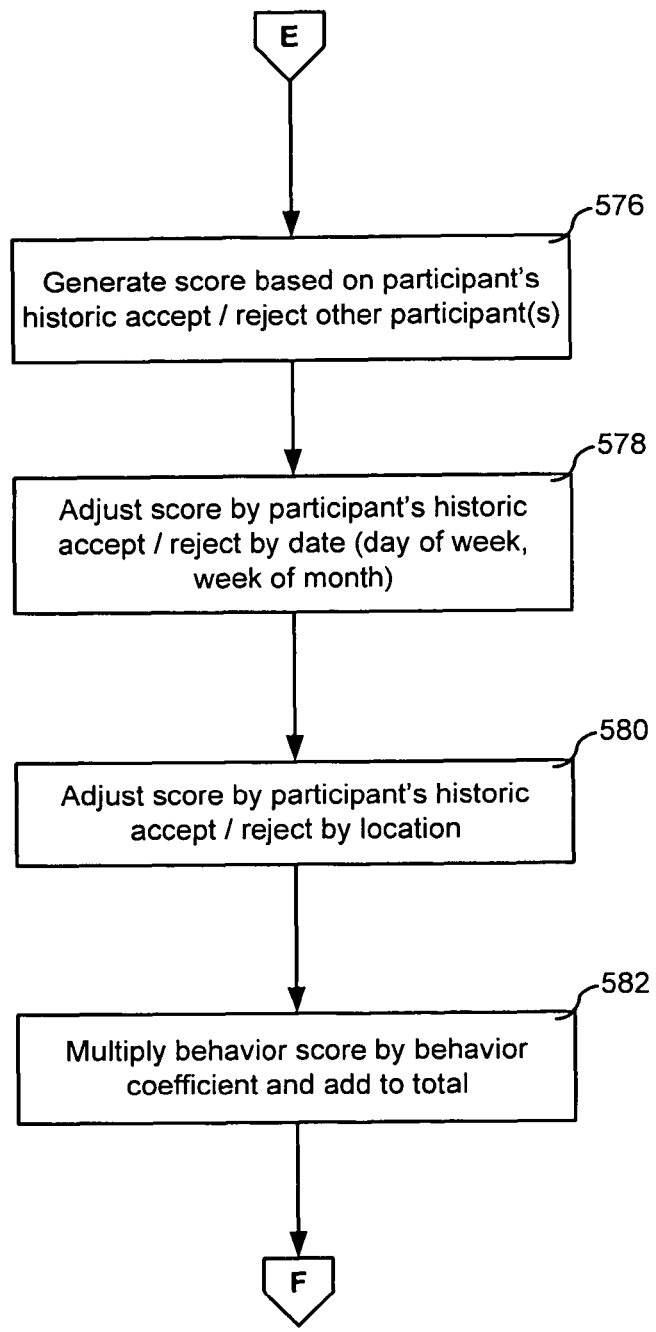
Figure 5F:
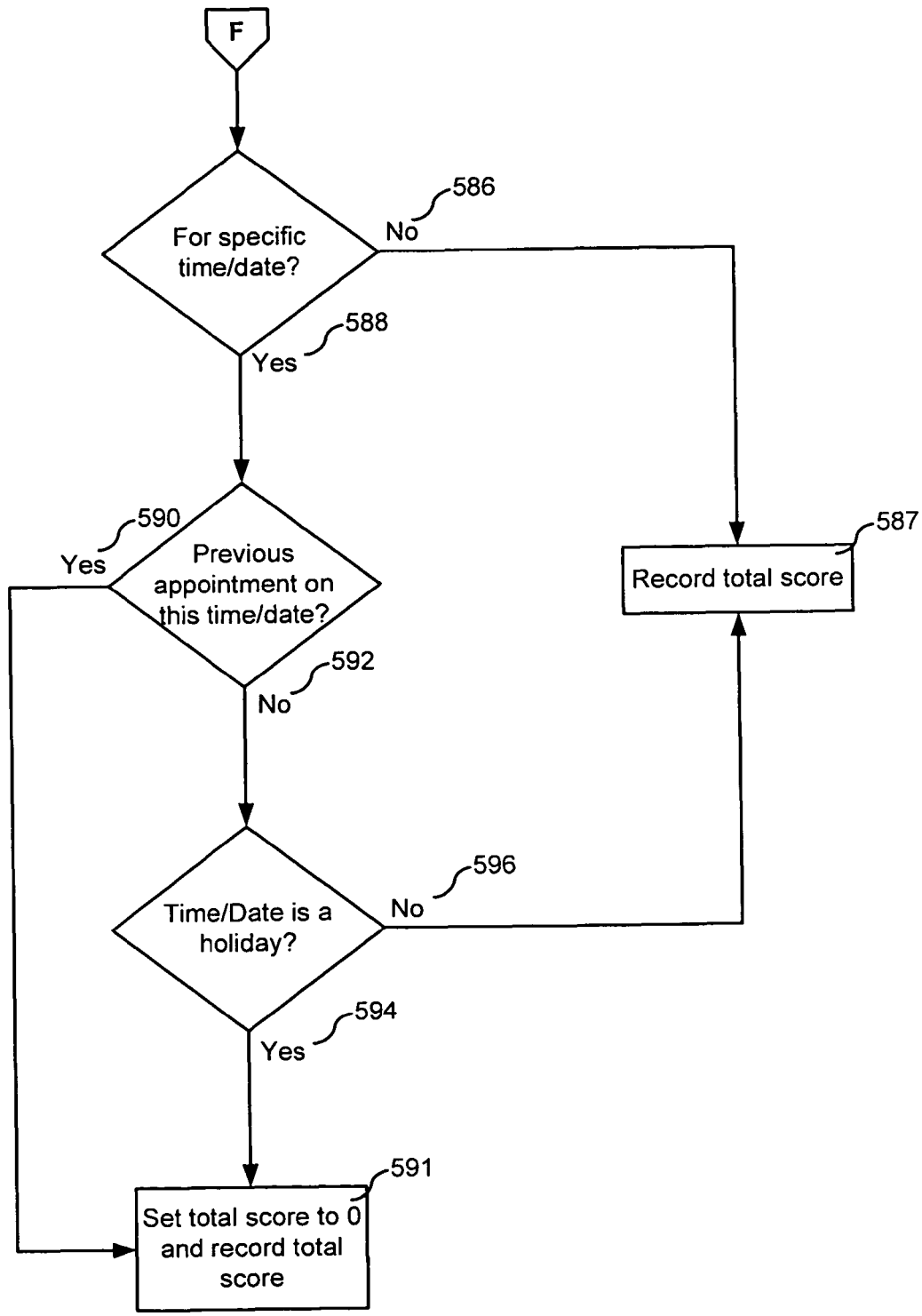

In accordance with some embodiments the group scheduling process takes into account participant behaviors (e.g., historical acceptance or rejection of previous appointments with the group) as discussed in greater detail above, with reference to FIG. 5E.

Other Features

In accordance with some embodiments, the appointment server system provides suggestions to a user as to potential participants for a particular appointment. In accordance with some embodiments, the suggestions are based on information attained through user-granted access to social networks or contact lists, which provides the appointment server system with information about which contacts of the user are likely participants appointments (e.g., lunches) with the user. For example, assume that users A and B have given the appointment server system access to their online address book or social network. As a result of that, the appointment server system sees that both A and B have contacts C and D in common, then the appointment server system can suggest that A and B have an appointment with C and/or D.

In accordance with some embodiments, the appointment server system allows individual potential appointment locations (e.g., restaurants, coffee shops, rental spaces) to offer access to the appointment server system to their customers in order to encourage their customers to schedule appointments at their establishment. This service can be offered through a website of the appointment location as an embeddable widget which accesses the appointment server system, or through any of a variety of white-labeled or co-branded applications designed for social networks like FACEBOOK or MYSPACE, or for platforms such as IPHONE, ANDROID, or PALM.

In accordance with some embodiments the appointment server system is configured to display advertising to a user and other participants during the appointment scheduling process. In some embodiments, restaurants and other potential appointment locations can purchase advertising from the operator of the appointment server system to ensure that their establishment appears in a featured position at key points throughout the appointment scheduling process (e.g., when the user is setting up their preferred appointment locations or when the user is selecting a restaurant for a particular appointment). In accordance with some embodiments the appointment server system is configured to provide discounts or coupons in the appointment invitations to encourage users to change the location for the appointment to a location with a provided discount or coupon. In a further embodiment, the appointment server system is configured to allow appointment locations (e.g., restaurants) to purchase the right to be the default location for searches with an epicenter within a predetermined distance from the location (e.g. one mile). For example, Restaurant X could purchase the right to be the default restaurant for every automatically scheduled appointment within one mile of the location of the Restaurant X.

Although FIGS. 1-3 show various computing devices including an "appointment server system," and a "client system," FIGS. 1-3 are intended more as functional description of the various features which may be present in a set of servers than as a structural schematic of the embodiments described herein. In practice, and as recognized by those of ordinary skill in the art, items shown separately could be combined and some items could be separated. Each of the above elements identified in FIGS. 2-3 may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. For example, some items shown separately in FIG. 2 could be implemented on a single server and single items could be implemented by one or more servers. Similarly, some items shown separately in FIG. 3 could be implemented on a single server and single items could be implemented by one or more servers. The actual number of computing devices used to implement an appointment server system or a client system and how features are allocated among them will vary from one implementation to another, and may depend in part on the amount of data traffic that the system must handle during peak usage periods as well as during average usage periods.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for appointment scheduling, comprising:
   at an appointment server system including a processor and memory:
      receiving appointment preference information from a client system associated with a user, wherein the appointment preference information includes contact details for one or more contacts of the user and scheduling details indicating that the user would like to schedule a plurality of appointments occurring on different dates in accordance with a periodic interval;
      in response to receiving the appointment preference information from the client automatically, without human intervention, scheduling a plurality of respective proposed appointments on different respective dates selected in accordance with the periodic interval, and for each respective proposed appointment sending a respective electronic message to a respective plurality of participants for the respective proposed appointment, the respective electronic message including an invitation to the respective proposed appointment, wherein the plurality of respective proposed appointments include:
         a first proposed appointment scheduled by the appointment server system based at least in part on the appointment preference information, wherein the first proposed appointment includes a first location, a first plurality of participants including the user and a first contact of the one or more contacts that was not selected by the user, and a first date that was selected, without human intervention, in accordance with the periodic interval; and
         a second proposed appointment scheduled by the appointment server system based at least in part on the appointment preference information and the periodic interval, wherein the second proposed appointment includes a second location, a second plurality of participants including the user and a second contact of the one or more contacts that was not selected by the user, and a second date that was selected, without human intervention, in accordance with the periodic interval, wherein the second proposed appointment is not a recurrence of the first proposed appointment.

2. The method of claim 1, wherein scheduling a first proposed appointment based at least in part on the appointment preference information includes searching a database to determine previously defined appointment preference information including appointment preference information associated with the user and, appointment preference information associated with the contact.

3. The method of claim 1, wherein the first date includes a time of day.

4. The method of claim 1, further comprising:
   receiving a reply from at least a subset of the first plurality of participants; and
   in response to receiving the replies:
      when replies indicating an acceptance of the first proposed appointment have been received from a predefined number of the participants, sending electronic messages to the plurality of participants including a confirmation of the first proposed appointment.

5. The method of claim 4, further comprising sending a message to a restaurant reservation service and receiving a response confirming the reservation.

6. The method of claim 1, further comprising:
   receiving a reply from at least a subset of the first plurality of participants; and
   in response to receiving the replies:
      when replies indicating a rejection of the first proposed appointment have been received from a predefined number of the participants, sending electronic messages to the plurality of participants including a cancellation of the first proposed appointment.

7. The method of claim 1, further comprising:
receiving a reply from at least a subset of the first plurality of participants; and
in response to receiving the replies:
when replies indicating an acceptance of the first proposed appointment have not been received from a predefined threshold of the participants before a predefined time period has elapsed, sending electronic messages to the one or more of the first plurality of participants including a cancellation of the first proposed appointment.

8. The method of claim 1, further comprising:
in response to the receiving appointment preference information from the client, sending an electronic message to the user including a placeholder calendar entry indicative of the appointment preference information provided by the user.

9. The method of claim 1, wherein the first plurality of participants includes at least one participant that is not included in the second plurality of participants.

10. The method of claim 1, wherein appointment preference information includes information that was collected from third party websites.

11. The method of claim 1, wherein appointment preference information includes one or more of: an availability of the user including a plurality of times when the user is available for an appointment, a user location, a user rating of one or more of the participants, travel preferences of one or more of the participants, appointment location preferences of one or more of the participants, dietary restrictions/preferences of one or more of the participants.

12. The method of claim 1, further comprising:
preparing for display to the user an invitation to the first proposed appointment; and
preparing for display to a contact of the user an invitation to the first proposed appointment.

13. The method of claim 1, including:
receiving a reply from a participant; and
in response to receiving the reply, updating the appointment preference information for the user.

14. The method of claim 1, wherein:
the electronic message sent to a first participant of the plurality of participants includes an indication of a first travel time of the first participant to the first location; and
the electronic message sent to a second participant of the plurality of participants includes an indication of a second travel time of the second participant to the first location.

15. The method of claim 14, wherein the indication of the travel time of a respective participant of the plurality of participants to the first location includes a calendar appointment with a start time that is the first time adjusted by a travel time of the participant to the first location.

16. The method of claim 1, including, prior to automatically scheduling the first proposed appointment:
receiving, at a first appointment server system, from a mobile device, location information indicative of the location of the user; and
storing appointment preference information indicative of the likely location of a user.

17. The method of claim 1, wherein the scheduling details do not include information specifying particular dates on which the user would like to schedule an appointment with particular contacts.

18. An appointment server system, comprising:
one or more processors;
memory; and
one or more programs, wherein the one or more programs are stored in the memory and are configured to be executed by the one or more processors, the one or more programs comprising instructions to:
receive, at the appointment server system, appointment preference information from a client system associated with a user, wherein the appointment preference information includes contact details for one or more contacts of the user and scheduling details indicating that the user would like to schedule a plurality of appointments occurring on different dates in accordance with a periodic interval;
in response to receiving the appointment preference information from the client automatically, without human intervention, schedule a plurality of respective proposed appointments on different respective dates selected in accordance with the periodic interval, and for each respective proposed appointment sending a respective electronic message to a respective plurality of participants for the respective proposed appointment, the respective electronic message including an invitation to the respective proposed appointment, wherein the plurality of respective proposed appointments include:
a first proposed appointment scheduled by the appointment server system based at least in part on the appointment preference information, wherein the first proposed appointment includes a first location, a first plurality of participants including the user and a first contact of the one or more contacts that was not selected by the user, and a first date that was selected, without human intervention, in accordance with the periodic interval; and
a second proposed appointment scheduled by the appointment server system based at least in part on the appointment preference information and the periodic interval, wherein the second proposed appointment includes a second location, a second plurality of participants including the user and a second contact of the one or more contacts that was not selected by the user, and a second date that was selected, without human intervention, in accordance with the periodic interval, wherein the second proposed appointment is not a recurrence of the first proposed appointment.

19. A non-transitory computer readable storage medium storing one or more programs configured for execution by one or more processors of an appointment server system, the one or more programs comprising instructions to:
receive, at the appointment server system, appointment preference information from a client system associated with a user, wherein the appointment preference information includes contact details for one or more contacts of the user and scheduling details indicating that the user would like to schedule a plurality of appointments occurring on different dates in accordance with a periodic interval;
in response to receiving the appointment preference information from the client automatically, without human intervention, schedule a plurality of respective proposed appointments on different respective dates selected in accordance with the periodic interval, and for each respective proposed appointment sending a respective electronic message to a respective plurality of participants for the respective proposed appointment, the respective electronic message including an invitation to the respective proposed appointment, wherein the plurality of respective proposed appointments include:

a first proposed appointment scheduled by the appointment server system based at least in part on the appointment preference information, wherein the first proposed appointment includes a first location, a first plurality of participants including the user and a first contact of the one or more contacts that was not selected by the user, and a first date that was selected, without human intervention, in accordance with the periodic interval; and a second proposed appointment scheduled by the appointment server system based at least in part on the appointment preference information and the periodic interval, wherein the second proposed appointment includes a second location, a second plurality of participants including the user and a second contact of the one or more contacts that was not selected by the user, and a second date that was selected, without human intervention, in accordance with the periodic interval, wherein the second proposed appointment is not a recurrence of the first proposed appointment.

* * * * *